(12) United States Patent
Suzuki et al.

(10) Patent No.: US 7,074,497 B2
(45) Date of Patent: Jul. 11, 2006

(54) COATED STEEL SHEET AND METHOD FOR MANUFACTURING THE SAME

(75) Inventors: Yoshitsugu Suzuki, Kurashiki (JP); Kazuaki Kyono, Chiba (JP)

(73) Assignee: JFE Steel Corporation, Tokyo (JP)

( * ) Notice: Subject to any disclaimer, the term of this patent is extended or adjusted under 35 U.S.C. 154(b) by 181 days.

(21) Appl. No.: 10/485,075

(22) PCT Filed: Feb. 26, 2003

(86) PCT No.: PCT/JP03/02147

§ 371 (c)(1),
(2), (4) Date: Jan. 28, 2004

(87) PCT Pub. No.: WO03/074751

PCT Pub. Date: Sep. 12, 2003

(65) Prior Publication Data

US 2004/0234807 A1 Nov. 25, 2004

(30) Foreign Application Priority Data

| Mar. 1, 2002 | (JP) | ............................. 2002-056139 |
| Aug. 7, 2002 | (JP) | ............................. 2002-229586 |
| Sep. 17, 2002 | (JP) | ............................. 2002-270281 |
| Sep. 17, 2002 | (JP) | ............................. 2002-307635 |

(51) Int. Cl.
*B32B 15/00* (2006.01)
*B05D 1/18* (2006.01)

(52) U.S. Cl. ...................... 428/659; 428/627; 428/632; 428/633; 428/926; 428/939; 148/533; 148/648; 148/650; 148/653; 427/433; 427/436

(58) Field of Classification Search ................ 428/659, 428/627, 632, 633, 926, 939; 148/533, 648, 148/650, 653; 427/433, 436
See application file for complete search history.

(56) References Cited

U.S. PATENT DOCUMENTS 6,797,410 B1 * 9/2004 Ishii et al. .................. 428/659

FOREIGN PATENT DOCUMENTS

| JP | A 60-017052 | 1/1985 |
| JP | B 03-051778 | 3/1991 |
| JP | A 05-171344 | 7/1993 |
| JP | A 2002-047535 | 2/2002 |
| JP | A 2003-105492 | 4/2003 |
| JP | 2004-323970 A * | 11/2004 |
| WO | WO 01/009396 A1 | 2/2001 |

* cited by examiner

*Primary Examiner*—Robert R. Koehler
(74) *Attorney, Agent, or Firm*—Oliff & Berridge, PLC

(57) ABSTRACT

A coated steel sheet having a coated layer on surfaces of a steel sheet of a composition containing not less than 0.1 mass % and under 3 mass % of Al, wherein a following condition
A or B is met:
A: An AlN precipitate layer exists on a matrix side near an interface between said steel sheet and said coated layer
B: Oxide of Al exists in said matrix right under said surfaces of said steel sheet.

20 Claims, 3 Drawing Sheets

PICTURE OF ELECTRON MICROSCOPE OBSERVATION OF SECTIONAL AREA SHOWING REGION WHERE NITRIDE LAYER PRECIPITATED

PICTURE OF ELECTRON MICROSCOPE OBSERVATION OF SECTIONAL AREA SHOWING REGION WHERE NITRIDE LAYER PRECIPITATED

EPMA(Al) ANALYSIS RESULT OF REGION WHERE NITRIDE LAYER PRECIPITATED

① Al WAS MOSTLY CONSUMED IN NITRIDATION AND WAS HARDLY SOLID-SOLVED IN THE MATRIX

② THE REGION WHERE Al WAS NOT NITRIDED AND EXISTS ALMOST IN SOLID SOLUTION PHASE

COATED STEEL SHEET AND METHOD FOR MANUFACTURING THE SAME

TECHNICAL FIELD

The present invention relates to a coated steel sheet and a method for manufacturing the coated steel sheet suitable for technical fields, such as automobiles, construction materials, and household appliances.

BACKGROUND ART

In recent years, in fields, such as automobiles, construction materials, household appliances, and so on, the use of high-tensile steel sheet has increased. Particularly in the automotive industry, the adoption of high-tensile steel sheet is increasing rapidly with a view to reducing car weight for better fuel economy and improved crashworthiness.

In addition to high tensile strength, to provide ductility to withstand a complicated press-forming, development has been actively pushed forward for a high-ductile high-tensile steel of a structure containing retained austenite to utilize a strain-induced transformation of this retained austenite.

As an example of high-tensile steel sheets, there is one that has a composition including addition elements such as Si, Mn, Ti, Al and P, which is disclosed in Japanese Patent Publication No. 3-51778. It is well known, however, that as the Si content is increased, an Si oxide film is formed on the surfaces of the steel sheet during an annealing process, thus deteriorating the steel properties, such as chemical properties, electro-galvanized coating adhesion, hot-dip galvanizability, and hot-dip galvanized coating adhesion. Above all else, the big problem is the inferior hot-dip galvanizability of Si-containing high-tensile steel sheets, i.e., the applied zinc does not adhere to some portions of the steel sheet (so-called "bare-spot") in hot-dip galvanizing, or the adhesion of the coating is insufficient. When a steel sheet contains not less than 0.1% carbon by mass, there has been difficulty in carrying out galvanizing or forming a stable galvanized layer even on a continuous hot-dip galvanizing line, which includes a RTH (all Radiant Tube Heating) type furnace or a NOF (Non Oxidizing Furnace) type furnace.

As a method for increasing ductility and tensile strength without increasing the Si content, a technique for achieving high ductility and high tensile strength has been disclosed, in which instead of increasing the Si content, the Al content in the steel is positively increased to thereby prevent the surface quality deterioration peculiar to the Si-added steel and simultaneously make the retained austenite stable (JP-A-5-171344).

However, because Al and Si are readily oxidizable elements, in addition to the Si oxide film, an Al oxide film is formed during annealing, and as with the Si-added steel, it has been impossible to prevent deteriorations in the hot-dip galvanizability and the galvanized coating adhesion in the Al-added steel sheet.

It is generally well known that Al is an element to deteriorate weldability. To make an Al-added steel practically applicable, it has become an imperative requirement to improve its spot-weldability.

When a high-tensile steel sheet is used for automobiles, after chemical treatment or electrodeposition coating, a top coat is applied when necessary, and as demand is mounting for rust resistance in recent years, the improvement of corrosion resistance after an electrodeposition process is increasingly important. However, a high-tensile steel sheet, which contains a large amount of galvannealing elements with high reactivity, is poorer in corrosion resistance than mild steel. For this reason, if one tries to further improve corrosion resistance, there is a problem of difficulty in increasing high strength.

The present invention has been made to solve the above problems in the prior art, and has as its object to provide a coated steel sheet superior in coating adhesion even if the base sheet is an Al-containing steel sheet, and also provide a method for manufacturing this coated steel sheet.

DISCLOSURE OF THE INVENTION

To solve the above problems, according to the present invention, there is provided a coated steel sheet which has a coated layer on a surface of a steel sheet of a composition containing not less than 0.1 mass % and under 3 mass % of Al, wherein there is an AlN precipitate layer on the matrix side near the interface between the steel sheet and the coated layer or there is an oxide of Al in the steel matrix right under the surface of the steel sheet.

Further, the coated layer preferably is a hot-dip galvanized layer and contains 0.1~1.0 mass % of Al.

Further, the coated layer preferably is a Zn—Fe galvanneal coating that further contains 7~15 mass % of Fe.

Further, the AlN precipitate layer preferably has a thickness of not less than 1 µm and not more than 100 µm.

In addition, the steel composition preferably further contains one or two kinds selected from not less than 0.1 mass % of Si and not less than 0.5 mass % of Mn.

Moreover, the steel composition preferably further contains one or two kinds selected from not less than 0.01 mass % and not more than 1 mass % of Mo and not less than 0.005 mass % and not more than 0.2 mass % of Nb.

Furthermore, the steel composition preferably further contains not less than 0.01 mass % and not more than 0.5 mass % of Cu, not less than 0.01 mass % and not more than 1 mass % of Ni, and not less than 0.01 mass % and not more than 1 mass % of Mo.

Moreover, the steel composition preferably further contains 0.03~0.25 mass % of C, 0.001~1.0 mass % of Si, 0.5~3.0 mass % of Mn, and 0.001~0.10 mass % of P.

Further in the steel matrix, there are preferably one or more kinds selected from oxides of $SiO_2$, MnO, $FeSiO_3$, $Fe_2SiO_4$, $MnSiO_3$, $Mn_2SiO_4$, and $P_2O_5$.

Further, the amount of oxides in total per one side surface is preferably 0.01~1.0 g/m².

Further, the steel composition preferably contains 0.01~1.0 mass % of Mo and 0.005~0.2 mass % of Nb.

Further, the steel composition is preferably 0.01~0.5 mass % of Cu, 0.01~1.0 mass % of Ni, and 0.01~1.0 mass % of Mo.

Moreover, the coated layer is preferably galvannealed.

In addition, the Fe content in the galvannealed coated layer is preferably 7~15% by mass.

On the other hand, a method for manufacturing a coated steel sheet according to the present invention comprises the steps of heating and holding a steel slab, and hot-rolling the slab and hot-dip-galvanizing a hot-rolled steel sheet, wherein the slab contains not less than 0.1 mass % under 3 mass % of Al, and the above-mentioned holding is carried out in an atmosphere containing not less than 1 vol % and not more than 20 vol % of $O_2$ and not less than 70 vol % of $N_2$ under the conditions that meet an equation (1) shown below and the above-mentioned galvanizing is performed by using a galvanizing bath with an Al concentration in the bath is 0.14~0.24 mass % at a bath temperature of 440~500° C.

$$\{\text{Heating and holding temp. (° C.)} - (1050 + 25\text{Al})\} \times \text{heating and holding time (min)} \geq 3000 \quad (1)$$

wherein Al denotes an Al content (mass %) in the steel.

Preferably, the steel sheet is galvanized by using a galvanizing bath of Al concentration of 0.10~0.20 mass % in the bath at a bath temperature of 440~500° C. and the hot-dip-galvanized layer is further subjected to a galvannealing process at 460~550° C.

Further, preferably, cold-rolling is carried out between the hot-rolling process and the hot-dip galvanizing process.

Moreover, the steel slab preferably further contains one or two kinds selected from not less than 0.1 mass % of Si and not less than 0.5 mass % of Mn.

Additionally, the slab preferably further contains one or two kinds selected from not less than 0.01 mass % and not more than 1 mass % of Mo and not less than 0.005 mass % and not more than 0.2 mass % of Nb.

Moreover, the slab preferably further contains not less than 0.01 mass % and not more than 0.5 mass % of Cu and not less than 0.01 mass % and not more than 1 mass % of Ni, and not less than 0.01 mass % and not more than 1 mass % of Mo.

BEST MODE FOR CARRYING OUT THE INVENTION

Figure 1:
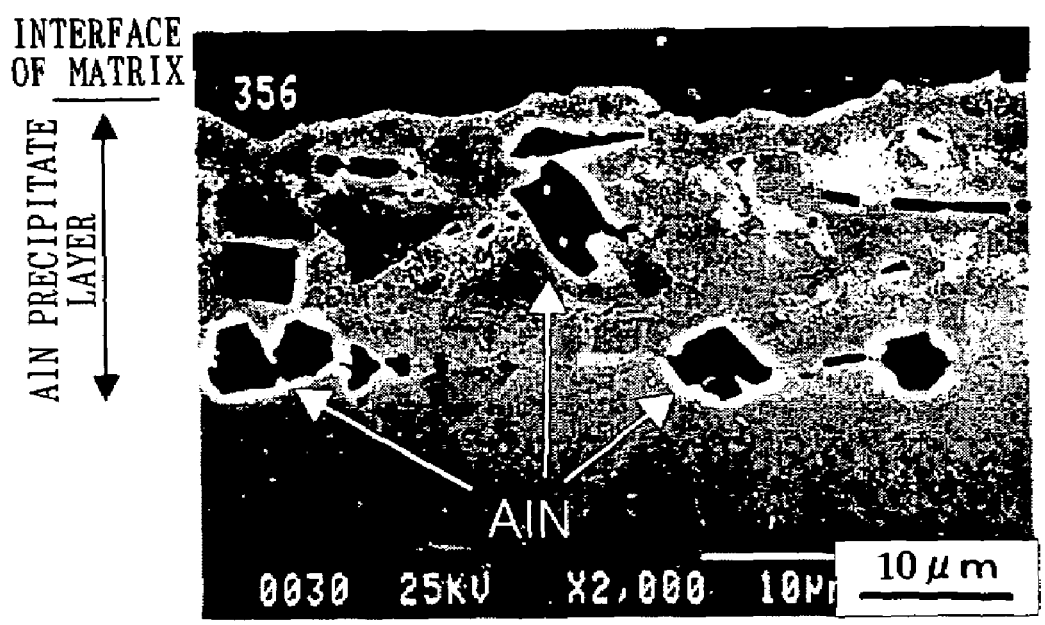
FIG. 1 is a picture showing an electron microscope observation result of an AlN precipitate layer.

Description will be made of a coated steel sheet, and particularly of a hot-dip galvanized steel sheet and a method for manufacturing the hot-dip galvanized steel sheet.

(1) FIRST EMBODIMENT

Description will start with a chemical composition of a steel sheet as a base sheet for coating as a first embodiment of the present invention. Note that in the following description, the contents of elements in steel are mentioned only by percents, but they should all be construed as figures in percents by mass.

(Not Less than 0.1% Under 3% of Al)

In this first embodiment, steel sheets that contain not less than 0.1% of Al are used. The reason is as follows. So long as the Al content in steel is under 0.1%, a decrease in the coating adhesion caused by a surface segregation of Al is less of a problem, or AlN is not formed, which will be described later. Further, in this embodiment, from a viewpoint of securing a strength-ductility balance, it is preferable to provide a steel structure that contains retained austenite; however, if the Al content is under 0.1%, the retained austenite is unstable, so that the steel is required to contain not less than 0.1% of Al, which is adequate from a point of view of attaining abetter strength-ductility balance. Note, however, that with steel sheets of Al content of not less than 3.0 mass %, as described later, even if AlN is formed in the surface layer of the steel sheet, the amount of Al surface segregation during annealing increases, and it is difficult to obtain an improved quality of the coating adhesion even though one does what one can do in formulating a better method of generating a nitride layer. Consequently, the Al content is limited to under 3.0%.

(One or Two Kinds Out of not Less than 0.1% of Si and not Less than 0.5% of Mn)

Si and Mn may be contained since they are conducive to high strength. Above all else, not less than 0.1% of Si and not less than 0.5% of Mn are preferably contained from a viewpoint of achieving high strength. However, Si content of over 1.0% and Mn content of over 0.5% makes it difficult to secure weldability and coating adhesion; therefore, preferably, the upper limit of the Si content is limited to 1.0% and the upper limit of Mn to 3.5%.

(One or Two Kinds Out of not Less than 0.01% and not More than 1% of Mo and not Less than 0.005% and not More than 0.2% of Nb)

Mo and Nb reduce the grain size of the matrix structure and retard the recrystallization, to thereby promote the internal oxidation of Al in the temperature rising process. In this way, Mo and Nb have an effect of suppressing the surface segregation of Al. Therefore, Mo and Nb can be contained in steel to obtain a better coating adhesion. This effect appears at a Mo content of not less than 0.01% and the Nb content of not less than 0.005%. However, when the Mo content is over 1%, in hot-rolling in the production process of a base sheet for a galvanized steel sheet, there appears a tendency for the surface property to deteriorate. Further, when the Nb content is over 0.2%, there is a tendency that the steel hardness rises and the rolling property deteriorates. Therefore, preferably, Mo is contained in a range of not less than 0.01% and not more than 1%, and Nb in a range of not less than 0.005% and not more than 0.2%. Mo and Nb maybe added in the ranges mentioned above. (Not less than 0.01% and not more than 0.5% of Cu, not less than 0.01% and not more than 1% of Ni, not less than 0.01% and not more than 1% of Mo)

When Cu, Ni and Mo are added, the coating adhesion is improved. The improvement mechanism of the coating adhesion by addition of Cu, Ni and Mo has not been clarified, but it has been confirmed that when those elements are added together, but not separately, the internal oxidation of Al is promoted to thereby suppress the surface segregation of Al, and the coating adhesion is improved.

As for other components, considering production cost and workability of an automotive steel sheet, it is suitable to use a steel sheet which contains 0.0005~0.25 mass % of C, 0.001~0.20 mass % of P, and 0.0001~0.01 mass % of S. Besides those elements, to further control the strength-ductility balance, it is no problem if a steel sheet is used which contains not more than 0.15 mass % of Ti, not more than 1 mass % of Cr, and 0.001~0.005 mass % of B to control the balance between strength and ductility of steel sheet. The rest preferably consists of Fe and unavoidable impurities.

Description will now be made of the AlN layer formed in the surface layer, the AlN layer serving as an important factor of this embodiment.

In this embodiment, an AlN precipitate layer where Al exists chiefly as AlN is formed in the surface layer of a steel sheet. For this reason, in the heating step before the galvanizing process, the Al in steel in the surface layer is fixed as nitride in the matrix and is inhibited from diffusing to the surface region of the steel sheet.

It has been recognized that when an AlN precipitate layer exists, there is an effect that Si and Mn, which are readily oxidizable elements like Al, are inhibited from increasing their densities in the surface layer when the steel is annealed, though the reason is unknown. Therefore, even with steel sheets which contain relatively large amounts of Si and Mn and therefore the coating adhesion is liable to deteriorate or "bare-spot" areas tend to occur, in the presence of an AlN precipitate layer, favorable hot-dip galvanizability and better coating adhesion can be obtained.

What is called the AlN precipitate layer here is a layer in which 20% or more of Al in the basic steel exists as nitride. When the amount of Al present as nitride is under 20%, the Al present in a solid solution phase is over 80%, and the Al existing in solid solution phase diffuses into the surface of the steel sheet, and therefore the above-mentioned bettering effects of coating adhesion is reduced.

The amount of Al that precipitated out as AlN is obtained by a method as follows. For a predetermined thickness (in steps of 5 μm, for example) from the surface layer, a predetermined amount of the AlN precipitate is dissolved by an electrolytic method using 10 w/v % of acetylacetone-1 w/v % of tetramethyl ammonium chloride-methanol, and insoluble residues are analyzed, by which the presence of AlN can be conformed. The residual AlN is decomposed by steam distillation, and by separating and determining only the quantity of N, the quantity of the N in the AlN precipitate can be determined. On the basis of this value, the quantity of Al in the AlN precipitate can be determined. Further, the quantity of a solid-solution Al can be determined by evaporating the rest other than the residue to dryness, again dissolving the residue in acid, and calculating the quantity of Al by an atomic absorption method compliant with JIS G 1257. From the above results, the proportion of nitride of Al in the AlN precipitate layer can be calculated.

Note that because the presence of AlN can be confirmed by EPMA analysis of the sectional area of a steel sheet and by analyzing both N and Al, the presence of AlN can be conformed by EPMA analysis in a simple manner.

Figure 2:
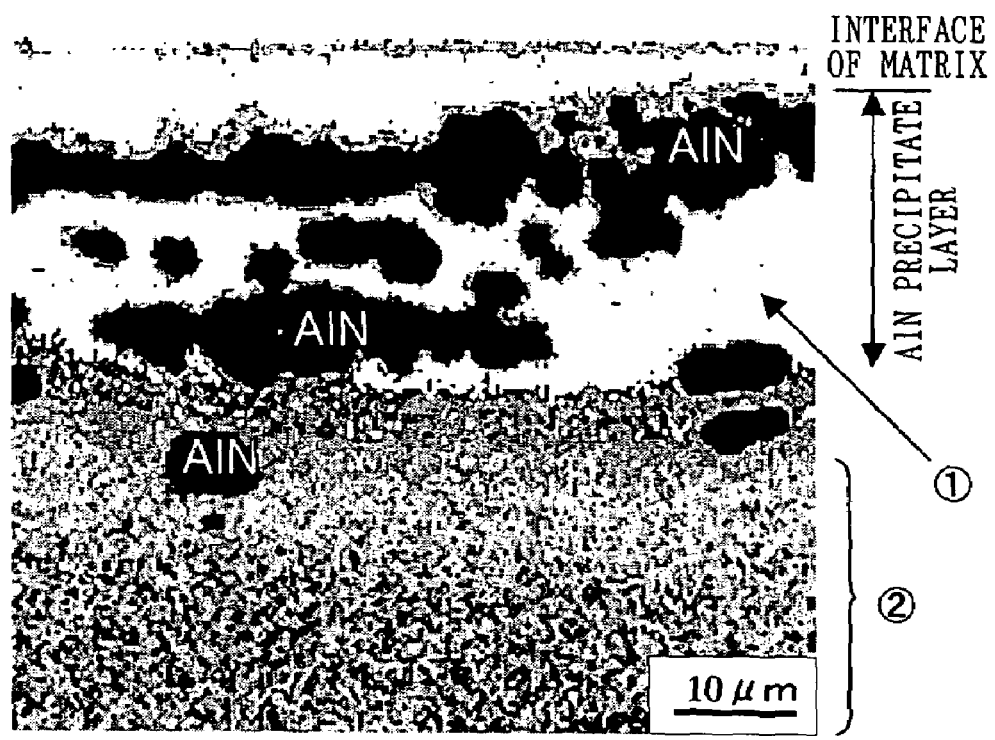
FIG. 2 is a picture showing AlN precipitate layer analyzed by EPMA.
Figure 3A:
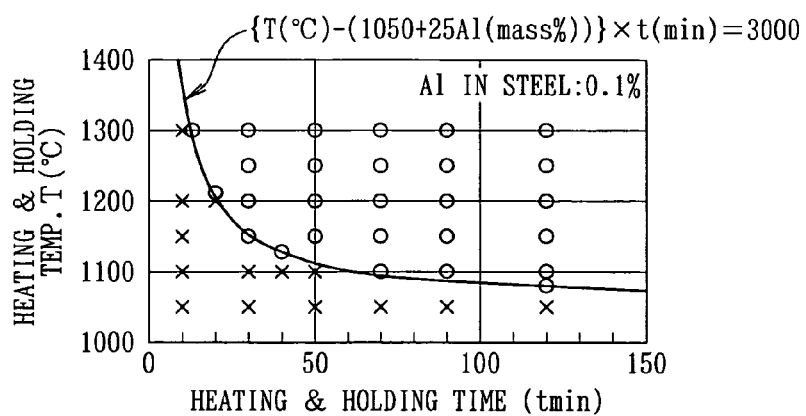
FIGS. 3A to 3D are graphs showing effects of holding temperature and holding time on the coating adhesion and the occurrence of the AlN precipitate layer when the slab was heated.
Figure 3B:
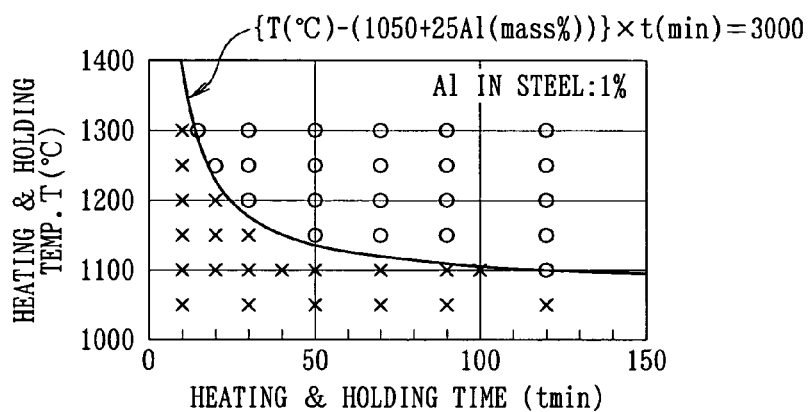
Figure 3C:
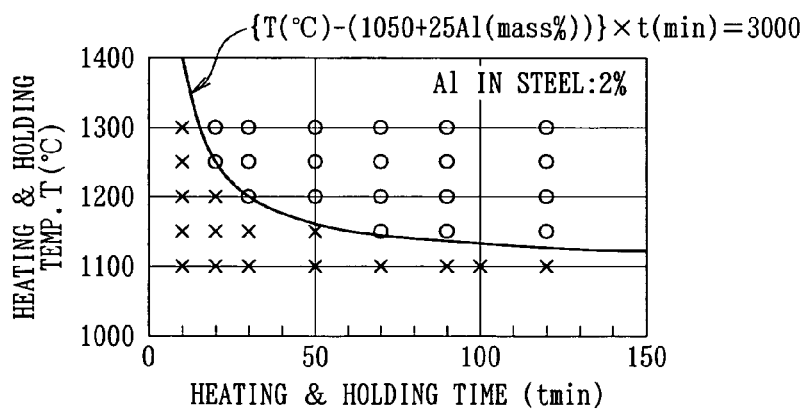
Figure 3D:
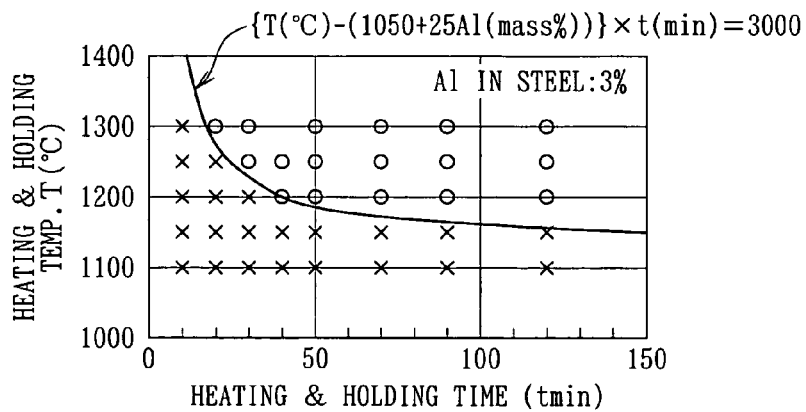

FIG. 1 is a picture showing an SEM electron microscope observation result of a sectional area of a steel sheet where an AlN precipitate layer is formed on the surface layer. FIG. 2 is a picture showing an analysis result of the presence of Al by EPMA. According to FIGS. 1 and 2, Al exists as nitride in a columnar or angular form and is distributed in a region 10~20 μm depth from the interface of the steel matrix, and it is obvious that in that portion of the region where AlN did not precipitate out, the quantity of solid solution of Al is not much. This region corresponds to the AlN precipitate layer. Therefore, the solid solution of Al is inhibited from diffusing from this region to the surface during annealing, and therefore the coating adhesion does not deteriorate. It is understood that in an area much deeper than that region, the presence of nitride is not recognized, but Al is present mostly in a solid solution phase.

The thickness of the AlN precipitate layer is preferably not less than 1 μm and not more than 100 μm. The reason is as follows. If there is some amount of AlN precipitate layer in the surface layer, an effect that prevents surface segregation of Al will appear, and this effect becomes conspicuous when the thickness of the AlN precipitate layer is 1 μm or more. It is practically difficult to form an AlN precipitate layer with a thickness of over 100 μm, and if the thickness is over 100 μm, the influence on the quality of material becomes not negligible.

By hot-dip galvanizing a base sheet for a hot-dip galvanized steel sheet which has the steel composition and the AlN precipitate layer as described above, a hot-dip galvanized steel sheet with excellent coating layer adhesion can be obtained.

Description will be made of a method for manufacturing a hot-dip galvanized steel sheet according to this embodiment.

As with an ordinary steel sheet for hot-dip galvanizing, a steel sheet (a base sheet) for hot-dip galvanizing according to this embodiment is manufactured by heating and holding a steel slab made by continuous casting or the like, subjecting the slab to a hot-rolling process or further to a cold-rolling process. In the present invention, in order to prevent Al from segregating at the surface in the annealing process before hot-dip galvanizing, it is necessary to have an AlN precipitate layer previously formed on the surface layer of the steel sheet before or after annealing.

With regard to a method for forming an AlN precipitate layer, the inventors hit upon a conception that by nitriding the Al in the steel surface layer when the steel slab was heated and held, it would be possible to make Al in the surface layer exist as AlN in the subsequent hot-rolling, acid-cleaning and cold-rolling processes. On the basis of the above conception, the present inventors investigated the conditions for heating and holding a steel slab.

Al is well known as an element that can be easily nitrided. As a result of our study, it has become clear that Al is nitrided more in preference over other elements when it is heated at a high temperature in an atmosphere chiefly consisting of $N_2$ and including $O_2$. The mechanism by which $O_2$ promotes the nitriding of Al has not necessarily been clarified. In an $O_2$-bearing atmosphere, oxides are formed in large amounts on the surface of the steel and the oxides serve as a diffusion path of nitrogen, a fact which is considered to be one factor of $O_2$ assisting in nitriding Al. It has also been clarified that in order to generate nitride of Al while the slab is being heated and held, the $O_2$ concentration is required to be at least 1 vol % or higher. Raising the $O_2$ concentration to 20 vol % or higher requires some other method for blowing oxygen into a heating and holding furnace and also accelerates oxidation of the steel matrix itself; therefore, it is necessary to limit the $O_2$ concentration to not more than 20 vol %. It does not matter if CO and $CO_2$, other than the components $O_2$ and $N_2$, are mixed, but $N_2$ needs to be 70 vol % or higher to generate nitride of Al.

In an $N_2$-bearing atmosphere, by heating and holding the above-mentioned slab at a high heating and holding temperature and in a prolonged heating and holding time, the Al in the surface layer of the slab can be nitrided. At this time, if the amount of Al in the steel is large, the heating and holding time to nitride the Al becomes longer accordingly. In this respect, on steels with varying Al contents, inquiry was made into the effects of the heating and holding time and temperature before hot-rolling on the adhesion of the hot-dip galvanized coating.

In practice, a slab of a composition containing 0.1~3% of Al, 0.5% of Si and 2.2% of Mn was used, in an atmosphere of 3 vol % of $O_2$ and the rest consisting of $N_2$, the slab was hot-rolled to a thickness of 2.8 mm. The oxide scale formed on the surface of an obtained hot-rolled steel sheet was removed by acid cleaning, and then the steel sheet was cold-rolled to a thickness of 1.6 mm, annealed at 810~825° C., and subjected to averaging at 400~460° C. Subsequently, the steel sheet was hot-dip galvanized in a hot-dip Zn bath with an Al concentration of 0.13 mass % and continuously treated by a galvannealing process at 500° C.

Samples for evaluating the coating adhesion were taken from a Zn—Fe galvanneal coated steel sheet. The coating adhesion was evaluated as follows. A test specimen to which a cellophane tape was attached was bent 90 degrees on the tape-attached side and bent back, the tape was peeled off, and the peeled-off amount of the coating per unit length was measured in terms of counts of Zn by a fluorescent X-ray method. Samples ranked first or second were classified as good (○, Δ) and those ranked third and so on were classified as defective (X) by referring to the criteria in Table 1.

TABLE 1

| X-Ray Fluores. Counts | Rank |
| --- | --- |
| 0~under 500 | 1 |
| 500~under 1000 | 2 |
| 1000~under 2000 | 3 |
| 2000~under 3000 | 4 |
| 3000 or more | 5 |

The evaluation results are shown in FIGS. 3A to 3D. According to FIGS. 3A to 3D, before hot rolling, a slab is heated and held under the conditions that the heating and holding temperature, the heating and holding time and the Al content in the steel meet equation (1), by which arrangement a hot-dip galvanized steel sheet with excellent coating layer adhesion can be manufactured.

$$\{\text{Heating and holding temperature }(°\text{C.}) - (1050 + 25\text{Al})\} \times \text{heating and holding time (mm)} \geq 3000 \quad (1)$$

where Al denotes an Al content (mass %) in the steel.

As a result of observation of a cold-rolled steel sheet to check the presence or absence of an AlN precipitate layer, it was confirmed that an AlN precipitate layer was formed in the surface layer when the above equation (1) was satisfied.

When a steel sheet with a chemical composition that contains not less than 0.1% and under 3% of Al is subjected to heating and holding before hot rolling in an atmosphere with an $O_2$ content of not less than 1 vol % and not more than 20 vol % under the condition that meets the equation (1), a steel sheet with an AlN precipitate layer in the surface layer can be manufactured. Moreover, though containing Al and other readily oxidizable elements such as Si and Mn, the steel sheet has an excellent coating adhesion after it has been hot-dip galvanized.

Note that the AlN formed by the above-mentioned method is not only included in the steel of the surface layer but also sometimes exists exposed on the surface of the steel matrix. Even in such a case, the AlN have no effects on the ductility and mechanical properties of the steel sheet nor has it effects on the surface quality such as coating layer adhesion. It is considered because the AlN precipitate layer is confined to the uppermost of the surface layer and its exposure at the surface of the steel matrix is limited to a very few parts thereof.

The hot-rolled steel sheet is obtained by hot rolling after heating and holding under the above conditions, and the steel sheet is then subjected to acid cleaning or acid cleaning plus cold rolling and annealing, and furthermore the steel sheet is hot-dip galvanized.

The acid cleaning of the hot-rolled steel sheet is done to remove the oxide scale formed on its surfaces. The conditions for acid cleaning are not limited to specific items, but because the AlN precipitate layer is required to remain, consideration must be given to prevent the steel matrix from being dissolved in large amounts during acid cleaning. The acid is preferably hydrochloric acid, but other acids such as sulfuric acid may be used. The concentration of the acid is preferably 1~20 mass %. To prevent the steel matrix from dissolving in large amounts, an inhibitor (dissolution inhibitor) is preferably added.

Cold rolling may be performed if necessary to control the mechanical properties and the thickness of a final product. When cold rolling is carried out, the draft is preferably 30% or higher to promote recrystallization in subsequent annealing. However, if the draft is 80% or higher, large load is applied to the rolling mill, making rolling difficult; therefore, the draft is preferably 30~80%.

Annealing just before hot-dip galvanizing may be by a method in which hot-dip galvanizing is performed successively after annealing has been done by well-known so-called continuous annealing, or by a method in which a steel sheet annealed once (primary annealing) is cooled, and then the steel sheet is acid-cleaned to activate its surface and also after the surface oxide formed by primary annealing is removed by acid cleaning, the steel sheet is heated again (secondary annealing) and successively hot-dip galvanized. However, the annealing process just before galvanizing preferably includes a step for uniformly heating the steel sheet at least partially under a reducing atmospheric condition chiefly consisting of $H_2$—$N_2$ with a view to deoxidizing the Fe-based surface oxide film and securing the hot-dip galvanized coating wettability. Or it is no problem if a process may be employed in which an Fe-based oxide film is formed in the temperature-rising process in an NOF (Nonoxidation furnace) type heating furnace, for example, and the oxide film is deoxidized. Note that primary annealing is preferably at 750~930° C. to obtain an appropriate structure. If the primary annealing temperature is higher than 930° C., the readily oxidizable elements such as Si increases its segregation at the surface which adversely affects the galvanizability and the galvannealability. The secondary annealing is preferably at 650° C. or higher with a view to deoxidizing the oxide film formed during acid cleaning, and preferably at not less than 850° C. with a view to preventing the coarse-grain, for example, of the steel structure.

Acid cleaning after primary annealing is performed, for example, by a method of light acid-cleaning at 60° C. for several seconds in a hydrochloric acid of about 5 mass % or so. Other acids such as sulfuric acid may be used. Generally, acid cleaning is preferably performed with acidity of $pH \leq 1$, temperature of 40~90° C. for 1~20 sec. If the temperature is below 40° C. and the time is less than 1 sec, the removal effect of surface segregates cannot be obtained, and if the temperature is higher than 90° C. and the time is longer than 20 sec, excessive acid cleaning occurs, which results in roughening of the surface.

A steel sheet is provided with a strength-ductility balance as follows. When annealing and hot-dip galvanizing are performed continuously in a continuous annealing process, it is desirable that after intercritical heating is finished, while bainite transformation is made to take place by averaging at 350~500° C. for not less than two minutes to let segregates of C appear in the austenite, and continuously performing hot-dip galvanizing. When hot-dip galvanizing is performed after primary annealing, cooling, acid cleaning, and secondary annealing, preferably, after intercritical heating by primary annealing, the steel sheet is quenched below 300° C. at a rate of not less than 40° C./s to obtain a hardened structure consisting of a ferrite-martensite phase, and immediately before galvanizing, a tempering process is carried out by heating to 725~840° C., and then cooling at a rate of not less than 5° C./s to form a composite structure of ferrite-tempered martensite-retained austenite, and finally hot-dip galvanizing is performed.

As a method for forming the AlN precipitate layer, description has been made of a method for adjusting the heating and holding conditions before hot rolling. Incidentally, a steel sheet for hot-dip galvanizing according to the present invention can be manufactured by annealing the steel sheet in an atmosphere of nitriding elements, such as an $H_2$—$N_2$ system gas, mixed with trace amounts of CO and $NH_3$ in the annealing process just before hot-dip galvanizing.

Description will be made of a hot-dip galvanized steel sheet according to this embodiment.

A hot-dip galvanized steel sheet according to this embodiment can be obtained by hot-dip galvanizing a steel sheet for hot-dip galvanizing purpose, which includes the above-mentioned AlN precipitate layer. The AlN layer remains on the matrix side near the interface between the steel sheet and the hot-dip galvanized layer after the hot-dip galvanizing process. The hot-dip galvanized steel sheet obtained as described has a good coating adhesion because the readily oxidizable elements such as Al, Si and Mn are inhibited from segregating at the interface between the steel matrix and the coating layer.

The hot-dip galvanized layer (hereafter referred to simply as the coating layer) is preferably a coating layer of a composition containing 0.1~1% of Al or an a Zn—Fe galvanneal coating layer that further contains 7~15% of Fe in addition to the above-mentioned chemical composition.

With a hot-dip galvanized steel sheet without galvannealing the coating layer (this steel sheet is hereafter referred to as GI), if the Al content in the coat layer is below 0.1%, the Fe—Zn galvannealing reaction shows rapid progress during the galvanizing process; therefore, unevenness occurs in the external appearance. With the GI, above all else, the Al content is preferably not less than 0.2% to inhibit the galvannealing reaction. When the Al content in the coating layer is over 1%, in the galvanizing process, the Fe—Al alloy layer becomes thick which is formed on the coating layer side close to the interface between the coating and the steel matrix, with the result that the weldability decreases.

If Pb, Sb or Ni, sometimes contained in trace amounts in a galvanizing bath, exists in the coating layer in a range of not more than 0.1% each, then there is no problem in terms of characteristics of the steel. When the Fe eluates into the galvanizing bath or the matrix Fe is mixed into the coating layer, if its amount is not more than 0.1% or so, there is no problem. Mg may be contained in a range not more than 5% to impart corrosion resistance to the steel. Besides those elements mentioned above, others are preferably Zn or unavoidable impurities.

Even with a Zn—Fe galvanneal coated steel sheet whose coating layer is galvannealed (hereafter referred to as GA), the quantity of Al in the coating layer is required to be 0.1~1%. The reason is as follows. If the Al content is below 0.1%, the Fe—Zn galvannealing reaction progresses so rapidly in a galvannealing process that the coating adhesion deteriorates; on the other hand, if the Al content is more than 1%, the Fe—Al alloy layer, which is formed on the coating layer side near the interface between the coating and the steel matrix, becomes so thick that the Fe—Zn galvannealing reaction is retarded. The desirable Al concentration is not more than 0.3%. With a Zn—Fe galvanneal coated steel sheet whose coating layer is galvannealed, if the Fe content in the coating layer is under 7%, a soft Zn—Fe galvanneal layer is formed, resulting in a lower slidability. Or, if the Fe content is over 15%, a hard and brittle Fe—Zn galvanneal layer is formed on the coating layer side near the interface between the steel matrix and the coating layer, and the result is a poor coating adhesion. For this reason, the Fe content in the Zn—Fe galvanneal coated steel sheet is preferably 7~15%. If Pb, Sb and Ni are contained in amounts of not more than 0.1% each, there is no problem in soldering properties. If Mg is contained in a range of not more than 5% to secure corrosion resistance, there is no problem at all. The rest preferably consists of Zn and unavoidable impurities.

For hot-dip galvanizing, a well-known method can be applied. For example, preferably, the bath temperature is 440~500° C. and the Al concentration in the bath is 0.10~0.20% when a galvannealing process is performed which will be described later, or 0.14~0.24% when a galvannealing process is not performed. Mg may be contained in the bath for better corrosion resistance.

After hot-dip galvanizing, if the coating layer undergoes a galvannealing process in a temperature range of 460~550° C., this is most desirable. If the temperature is under 460° C., the galvannealing reaction progresses slowly. Or if the temperature is above 550° C., excess galvannealing occurs; therefore, a hard and brittle Zn—Fe galvanneal layer is formed in large amounts at the interface of the matrix, causing the coating adhesion to deteriorate. Furthermore, if the steel is a steel with a retained austenite phase formed in the steel, when the galvannealing temperature is higher than 550° C., the retained austenite decomposes, and the strength-ductility balance tends to deteriorate. The coating layer weight has not been set, but from a viewpoint of securing the corrosion resistance and controlling the precision of coating weight, it is preferably not less than 10 g/m$^2$, and not more than 120 g/m$^2$ from a viewpoint of workability.

EMBODIMENT

Slabs of compositions shown in Table 2 are heated and held in an $N_2$ atmosphere of $O_2$ densities as shown in Tables 3 and 4 in a heating furnace at temperatures and conditions shown in Tables 3 and 4, and subsequently hot-rolled to a thickness of 2.8 mm and are coiled at 540~600° C. Subsequently, the skin scale was removed by acid cleaning. Some of hot-rolled steel sheets which have been acid-cleaned are cold-rolled into cold-rolled steel sheets with a thickness of 1.6 mm. Hot-rolled and cold rolled steel sheets obtained undergo primary annealing and overaging under conditions shown in Tables 3 and 4, and are hot-dip galvanized in a molten Zn bath at a bath temperature of 460° C. Or, if they are subjected to secondary annealing, they receive primary annealing and cooling, and then acid-cleaned in a 5% HCl solution at 60° C. After this, the steel sheets are heated at secondary annealing temperatures shown in Tables 3 and 4, and continuously they are hot-dip galvanized in a molten Zn bath at a bath temperature of 460° C.

The Al concentration in the molten Zn bath is adjusted as shown in Tables 5 and 6. The coating weight is adjusted to 50±5 g/m$^2$ for single side by gas wiping. When the coating layer is galvannealed, the galvannealing process is performed at 460~610° C.

Obtained hot-dip galvanized steel sheets are evaluated in terms of external appearance, coating adhesion, and mechanical properties. Samples are taken from the produced steel sheets, and the thickness was measured of the AlN precipitate layer formed on the matrix side right under the interface between the matrix and the coating layer, and the Al concentration and the Fe concentration in the coating layer were measured. Investigation results are shown in Tables 5 and 6.

TABLE 2

| Steel Symbol | Chemical Composition (mass %) | | | | | | | | | | | Remarks |
|---|---|---|---|---|---|---|---|---|---|---|---|---|
| | C | Si | Mn | P | S | Al | Ti | Nb | Mo | Cu | Ni | |
| A | 0.080 | 0.60 | 2.0 | 0.010 | 0.008 | 0.4 | — | — | — | — | — | Proper Example |
| B | 0.100 | 0.03 | 1.6 | 0.010 | 0.007 | 1.6 | — | — | — | — | — | Proper Example |
| C | 0.070 | 0.20 | 1.6 | 0.010 | 0.008 | 0.2 | — | — | — | — | — | Proper Example |
| D | 0.090 | 0.04 | 1.4 | 0.008 | 0.006 | 1.6 | 0.01 | 0.03 | 0.05 | — | — | Proper Example |
| E | 0.080 | 0.06 | 1.2 | 0.011 | 0.009 | 0.9 | 0.04 | — | 0.1 | 0.2 | 0.1 | Proper Example |
| F | 0.060 | 0.03 | 1.7 | 0.007 | 0.006 | 0.03 | — | — | — | — | — | Comparative Example |
| G | 0.070 | 0.50 | 2.2 | 0.013 | 0.009 | 0.3 | — | — | — | — | — | Proper Example |
| H | 0.090 | 0.25 | 1.8 | 0.010 | 0.008 | 0.21 | — | — | — | — | — | Proper Example |
| I | 0.077 | 0.04 | 1.4 | 0.009 | 0.009 | 1.5 | 0.04 | — | 0.11 | 0.19 | 0.09 | Proper Example |
| J | 0.060 | 0.03 | 1.3 | 0.007 | 0.006 | 1.3 | 0.01 | 0.04 | 0.06 | — | — | Proper Example |
| K | 0.080 | 0.02 | 1.8 | 0.011 | 0.007 | 2.2 | — | — | — | — | — | Proper Example |
| L | 0.080 | 0.06 | 1.8 | 0.008 | 0.006 | 0.02 | — | — | — | — | — | Comparative Example |

TABLE 3

| Steel Sheet No. | Steel Symbol | Slab Heating & Holding Conditions | | | | AlN Precipitate Layer | | Primary Annealing | | Secondary Annealing Anneal. Temp. (° C.) |
|---|---|---|---|---|---|---|---|---|---|---|
| | | Ht. & Hld. Temp. (° C.) | Ht. & Hld. Time (min) | Value of LHS of Eq. (1) *1 | O$_2$ Concentration In Slab-Heating Atm. (vol %) | Thickness Of AlN Ppt. Layer In Hot-Rolled Sheet(μm) | Al Solid Soln. Pct. In AlN Ppt. Layer(%) *2 | Anneal. Temp. (° C.) | Overaging Temp. (° C.) | |
| 1 | A | 1200 | 30 | 4200 | 2 | 0.9 | 20 | 825 | — | — |
| 2 | A | 1200 | 40 | 5600 | 2 | 4 | 20 | 825 | — | — |
| 3 | A | 1200 | 60 | 8400 | 2 | 9 | 20 | 825 | — | — |
| 4 | A | 1200 | 70 | 9800 | 2 | 11 | 20 | 825 | — | 775 |
| 5 | A | 1200 | 60 | 8400 | 2 | 9 | 20 | 825 | — | — |
| 6 | A | 1260 | 60 | 12000 | 2 | 18 | 20 | 825 | 450 | — |
| 7 | B | 1200 | 50 | 5500 | 2 | 7 | 22 | 825 | — | — |
| 8 | C | 1200 | 70 | 10150 | 2 | 11 | 10 | 825 | — | — |
| 9 | D | 1200 | 50 | 5500 | 2 | 7 | 22 | 825 | — | — |
| 10 | E | 1200 | 60 | 7650 | 2 | 9 | 21 | 825 | — | — |
| 11 | A | 1050 | 30 | −300 | 2 | 0 | — | 825 | 450 | — |
| 12 | A | 1050 | 30 | −300 | 2 | 0 | — | 825 | 450 | — |
| 13 | A | 1250 | 40 | 7600 | 2 | 15 | 20 | 825 | 450 | — |
| 14 | A | 1200 | 60 | 8400 | 2 | 9 | 20 | 825 | 450 | — |
| 15 | A | 1200 | 70 | 9800 | 2 | 11 | 20 | 825 | 450 | — |
| 16 | F | 1090 | 40 | 1570 | 2 | 0 | — | 825 | 450 | — |

*1: LHS value of Eq.(1) = {ht. & hld. temp. − (1050 + 25Al)} × ht. & hld. time
*2: Al solid soln. (%) = Al concentration in matrix of AlN ppt. layer/Al concentration at center in sheet thickness direction × 100

TABLE 4

| Steel Sheet No. | Steel Symbol | Slab Heating & Holding Conditions | | | | AlN Precipitate Layer | | Primary Annealing | | Secondary Annealing Anneal. Temp. (° C.) |
|---|---|---|---|---|---|---|---|---|---|---|
| | | Ht. & Hld. Temp. (° C.) | Ht. & Hld. Time (min) | Value of LHS of Eq. (1) *1 | O$_2$ Concentration In Slab-Heating Atm. (vol %) | Thickness Of AlN Ppt. Layer In Hot-Rolled Sheet(μm) | Al Solid Soln. Pct. In AlN Ppt. Layer (%) *2 | Anneal. Temp. (° C.) | Overaging Temp. (° C.) | |
| 17 | G | 1200 | 40 | 5700 | 4 | 0.3 | 25 | 820 | 450 | — |
| 18 | G | 1240 | 60 | 10950 | 6 | 8 | 25 | 810 | 400 | — |
| 19 | G | 1250 | 70 | 13475 | 12 | 22 | 25 | 825 | 460 | — |
| 20 | G | 1260 | 40 | 8100 | 10 | 8 | 25 | 825 | — | 775 |
| 21 | G | 1250 | 40 | 7700 | 10 | 8 | 25 | 810 | 450 | — |
| 22 | G | 1250 | 50 | 9625 | 10 | 9 | 25 | 825 | 450 | — |
| 23 | H | 1250 | 50 | 9737.5 | 10 | 10 | 10 | 825 | 450 | — |
| 24 | I | 1240 | 50 | 7625 | 11 | 8 | 22 | 825 | 440 | — |
| 25 | J | 1250 | 50 | 8375 | 10 | 8 | 22 | 825 | 450 | — |
| 26 | K | 1250 | 50 | 7250 | 10 | 8 | 25 | 800 | 460 | — |
| 27 | G | 1100 | 50 | 2125 | 10 | 0 | — | 825 | 440 | — |
| 28 | G | 1250 | 10 | 1925 | 10 | 0 | — | 825 | 450 | — |
| 29 | L | 1200 | 50 | 7475 | 9 | 0 | — | 825 | 430 | — |
| 30 | G | 1250 | 40 | 7700 | 25 | 0 | — | 825 | 440 | — |

TABLE 4-continued

| | | Slab Heating & Holding Conditions | | | | AlN Precipitate Layer | | Primary Annealing | | Secondary |
|---|---|---|---|---|---|---|---|---|---|---|
| Steel Sheet No. | Steel Symbol | Ht. & Hld. Temp. (° C.) | Ht. & Hld. Time (min) | Value of LHS of Eq. (1) *1 | O$_2$ Concentration In Slab-Heating Atm. (vol %) | Thickness Of AlN Ppt. Layer In Hot-Rolled Sheet (μm) | Al Solid Soln. Pct. In AlN Ppt. Layer (%) *2 | Anneal. Temp. (° C.) | Overaging Temp. (° C.) | Annealing Anneal. Temp. (° C.) |
| 31 | G | 1250 | 40 | 7700 | <u>0.5</u> | <u>0</u> | — | 825 | 450 | — |
| 32 | G | 1250 | 40 | 7700 | 10 | 8 | 25 | <u>950</u> | 450 | — |
| 33 | G | 1260 | 40 | 8100 | 8 | 9 | 25 | 825 | 450 | — |
| 34 | G | 1210 | 50 | 7625 | 9 | 8 | 25 | 825 | 460 | — |
| 35 | G | 1240 | 60 | 10950 | 10 | 12 | 25 | 825 | 450 | — |

*1: LHS value of Eq. (1) = {ht. & hld. temp. − (1050 + 25Al)} × ht. & hld. time
*2 : Al solid soln. % = Al concentration in matrix of AlN ppt. Layer/Al concentration at center in sheet thickness direction × 100

TABLE 5

| | | Hot-Dip Galvanizing Conditions | | | Hot-Dip Galvanizing Steel Sheet | | | |
|---|---|---|---|---|---|---|---|---|
| Steel Sheet No. | Kind Of Base Coating | Kind Of Coating Sheet | Al Concentration In Bath (mass %) | Galvannealing Temp. (° C.) | Thickness Of AlN Ppt. Layer (μm) | Al Solid Soln. Pct. In AlN Ppt. Layer (%) *2 | Al Concentration In Coat. Layer (mass %) | Fe Concentration In Coat. Layer (mass %) |
| 1 | GA | CR | 0.13 | 510 | 0.5 | 20 | 0.2 | 10 |
| 2 | GA | CR | 0.13 | 490 | 2 | 20 | 0.2 | 9 |
| 3 | GA | CR | 0.13 | 500 | 5 | 20 | 0.2 | 10 |
| 4 | GA | CAL | 0.13 | 500 | 6 | 20 | 0.2 | 11 |
| 5 | GI | CR | 0.18 | — | 5 | 20 | 0.40 | — |
| 6 | GA | HOT | 0.13 | 500 | 18 | 20 | 0.2 | 11 |
| 7 | GA | CR | 0.13 | 500 | 4 | 22 | 0.2 | 12 |
| 8 | GA | CR | 0.13 | 500 | 6 | 10 | 0.2 | 11 |
| 9 | GA | CR | 0.13 | 500 | 4 | 22 | 0.2 | 10 |
| 10 | GA | CR | 0.13 | 500 | 5 | 21 | 0.2 | 9 |
| 11 | GA | CR | 0.13 | 500 | <u>0</u> | — | 0.2 | 8 |
| 12 | GI | CR | 0.18 | — | <u>0</u> | — | 0.40 | 0.4 |
| 13 | GA | CR | 0.08 | 460 | 8 | 20 | <u>0.05</u> | 9 |
| 14 | GA | CR | 0.22 | 520 | 5 | 20 | <u>1.1</u> | <u>6</u> |
| 15 | GA | CR | 0.13 | 610 | 6 | 20 | 0.2 | <u>16</u> |
| 16 | GA | CR | 0.13 | 520 | 0 | — | 0.2 | 12 |

| Steel Sheet No. | Evaluation | | | |
|---|---|---|---|---|
| | External Appearance | Coating Adhesion | Mech. Char. | |
| 1 | Δ | Δ | Good | Invent. Ex. 1 |
| 2 | ○ | ○ | Good | Invent. Ex. 2 |
| 3 | ○ | ○ | Good | Invent. Ex. 3 |
| 4 | ○ | ○ | Good | Invent. Ex. 4 |
| 5 | ○ | ○ | Good | Invent. Ex. 5 |
| 6 | ○ | ○ | Good | Invent. Ex. 6 |
| 7 | ○ | ○ | Good | Invent. Ex. 7 |
| 8 | ○ | ○ | Good | Invent. Ex. 8 |
| 9 | ○ | ○ | Good | Invent. Ex. 9 |
| 10 | ○ | ○ | Good | Invent. Ex. 10 |
| 11 | X | X | Good | Comp. Ex. 1 |
| 12 | X | X | Good | Comp. Ex. 2 |
| 13 | ○ | X | Good | Comp. Ex. 3 |
| 14 | X *3 | ○ | Good | Comp. Ex. 4 |
| 15 | ○ | X | Good | Comp. Ex. 5 |
| 16 | ○ | ○ | No Good | Comp. Ex. 6 |

*2: Al solid soln. (%) = Al concentration in matrix of AlN ppt. layer/Al concentration at center in sheet thickness direction × 100
*3: Unevenness in galvannealing reaction

TABLE 6

| Steel Sheet No. | Kind Of Coating | Kind Of Base Sheet | Al Concentration In Bath (mass %) | Galvannealing Temp. (° C.) | Thickness Of AlN Ppt. Layer (μm) | Al Solid Soln. Pct. In AlN Ppt. Layer (%) *2 | Al Concentration In Coat. Layer (mass %) | Fe Concentration In Coat. Layer (mass %) | |
|---|---|---|---|---|---|---|---|---|---|
| 17 | GA | CR | 0.13 | 500 | 0.2 | 25 | 0.21 | 10 | Invent. Ex. 11 |
| 18 | GA | CR | 0.13 | 500 | 5 | 25 | 0.18 | 9 | Invent. Ex. 12 |
| 19 | GA | CR | 0.13 | 500 | 12 | 25 | 0.22 | 10 | Invent. Ex. 13 |
| 20 | GA | CAL | 0.13 | 500 | 5 | 25 | 0.19 | 11 | Invent. Ex. 14 |
| 21 | GI | CR | 0.18 | — | 5 | 25 | 0.40 | — | Invent. Ex. 15 |
| 22 | GA | HOT | 0.13 | 500 | 9 | 25 | 0.21 | 11 | Invent. Ex. 16 |
| 23 | GA | CR | 0.13 | 500 | 6 | 10 | 0.2 | 12 | Invent. Ex. 17 |
| 24 | GA | CR | 0.13 | 500 | 5 | 22 | 0.24 | 11 | Invent. Ex. 18 |
| 25 | GA | CR | 0.13 | 500 | 5 | 22 | 0.18 | 10 | Invent. Ex. 19 |
| 26 | GA | CR | 0.13 | 500 | 5 | 25 | 0.2 | 9 | Invent. Ex. 20 |
| 27 | GA | CR | 0.13 | 500 | 0 | — | 0.19 | 8 | Comp. Ex. 7 |
| 28 | GA | CR | 0.13 | 500 | 0 | — | 0.23 | 11 | Comp. Ex. 8 |
| 29 | GA | CR | 0.13 | 500 | 0 | — | 0.2 | 12 | Comp. Ex. 9 |
| 30 | GA | CR | 0.13 | 500 | 0 | — | 0.21 | 11 | Comp. Ex. 10 |
| 31 | GA | CR | 0.13 | 500 | 0 | — | 0.2 | 11 | Comp. Ex. 11 |
| 32 | GA | CR | 0.13 | 500 | 5 | 25 | 0.18 | 6.9 | Comp. Ex. 12 |
| 33 | GA | CR | 0.09 | 500 | 5.5 | 25 | 0.05 | 17 | Comp. Ex. 13 |
| 34 | GA | CR | 0.21 | 450 | 5 | 25 | 1.1 | 6 | Comp. Ex. 14 |
| 35 | GA | CR | 0.13 | 610 | 7 | 25 | 0.19 | 16 | Comp. Ex. 15 |

| Steel Sheet No. | External Appearance | Coating Adhesion | Mech. Char. | |
|---|---|---|---|---|
| 17 | Δ | Δ | Good | Invent. Ex. 11 |
| 18 | ○ | ○ | Good | Invent. Ex. 12 |
| 19 | ○ | ○ | Good | Invent. Ex. 13 |
| 20 | ○ | ○ | Good | Invent. Ex. 14 |
| 21 | ○ | ○ | Good | Invent. Ex. 15 |
| 22 | ○ | ○ | Good | Invent. Ex. 16 |
| 23 | ○ | ○ | Good | Invent. Ex. 17 |
| 24 | ○ | ○ | Good | Invent. Ex. 18 |
| 25 | ○ | ○ | Good | Invent. Ex. 19 |
| 26 | ○ | ○ | Good | Invent. Ex. 20 |
| 27 | X | X | Good | Comp. Ex. 7 |
| 28 | X | X | Good | Comp. Ex. 8 |
| 29 | ○ | ○ | No Good | Comp. Ex. 9 |
| 30 | X *4 | X | Good | Comp. Ex. 10 |
| 31 | X | X | Good | Comp. Ex. 11 |
| 32 | X | X | No Good | Comp. Ex. 12 |
| 33 | ○ | X | Good | Comp. Ex. 13 |
| 34 | X *3 | ○ | Good | Comp. Ex. 14 |
| 35 | Δ | X | No Good | Comp. Ex. 15 |

*2: Al solid soln. (%) = Al concentration in matrix of AlN ppt. layer/Al concentration at center in sheet thickness direction × 100
*3: Unevenness in galvannealing reaction
*4: Surface becomes rough In Tables 5 and 6, as coating kinds, a hot-dip galvanized coating layer that has been galvannealed is designated as GA and a hot-dip galvanized coating layer that has not been galvannealed is designated as GI. With regard to kinds of base sheets for coating, a case where a hot-rolled steel sheet is used is designated as HOT, a case where a cold-rolled steel sheet annealed once is used is designated as CR, and a case where a cold-rolled steel sheet subjected to annealing—acid cleaning—reheating is used is designated as CAL.

The external appearance was evaluated by visually checking the galvanizability with reference to criteria as follows.
○: Without any "bare-spot"
Δ: Generally no problem even though there are some "bare spots"
X: "bare" spots occurred conspicuously The coating layer adhesion was evaluated as follows. A cellophane tape was attached to the surface of a specimen, the tape-attached side was bent 90 degrees and bent back, the tape was peeled off, the peeled-off amount of the coating per unit length was measured in terms of counts of Zn by a fluorescent X-ray method. Samples ranked first or second were classified as good (○, Δ) and those ranked third and so on were classified as defective (X) by referring to the criteria in Table 1.

A hot-dip galvanized steel sheet (GI) that has not been galvannealed was put to a ball impact test, and a cellophane tape was attached to a processed part and the tape was peeled off. Whether the coating layer was peeled off or not was evaluated according to criteria as follows.
○: The coating layer did not peel off.
Δ: The coating layer peeled off a little.
X: The coating layer peeled off conspicuously.

In evaluation of mechanical properties, JIS-No.5 tension test specimens were collected, and from measured tensile strength TS(MPa) and elongation El (%), if a result of TS×El was not less than 20000 MPa·%, this was taken to represent a good strength-ductility balance and the hot-dip galvanized steel was determined to have a favorable mechanical properties.

With regard to the Al concentration in the coating layer, the coating was dissolved in an alkali, such as NaOH or KOH, or in an acid, such as HCl or $H_2SO_4$, added with an inhibitor, and its solution was analyzed and the concentration of Al was determined by a plasma emission spectrometer (ICP).

Likewise, the Fe concentration in the coating layer was measured by ICP by analysis and quantitative determination of Fe.

The thickness of the AlN precipitate layer was obtained by analyzing the sectional surface of a galvanized steel sheet by EPMA, and measuring the thickness of a region where there were precipitates of AlN and the Al concentration in the matrix area is lower than the central portion of the steel sheet. The Al concentration of the matrix area in the AlN precipitate layer was obtained by analyzing the above-mentioned insoluble residues.

From Tables 5 and 6, the hot-dip galvanized steel sheet (GA or GI) is Δ or ○ in evaluation of the external appearance and Δ or ○ in evaluation of coating adhesion; therefore, it is understood that this galvanized steel sheet has favorable galvanizability and coating adhesion. Furthermore, in respect to mechanical properties, the steel sheet shows a favorable strength-ductility balance of 20000 MPa·% or higher.

In contrast, in comparative examples 1, 2, 7, 8, 10 and 11, there is not AlN precipitate layer, and therefore the external appearance and the coating adhesion are poor. In comparative examples 3 and 13, in which the Al concentration is low in the coating, the coating adhesion is poor. In comparative examples 4, 5, 14 and 15 of Zn—Fe galvanneal coated steel sheet, the Al concentration in the coating layer is high in comparative examples 4 and 14 and the Fe concentration in the coating layer is low, so that there is unevenness in the galvannealing results. In comparative examples 5 and 15, because of the high Fe concentration in the coating layer, the coating adhesion is insufficient. In comparative examples 6 and 9, in which steel sheets of low Al content were used as base sheets, it is obvious that the mechanical properties are inferior. In comparative example 12, because the primary annealing temperature is too high, the galvannealing reaction in the coating layer did not progress sufficiently, and moreover, the coating adhesion and mechanical properties are deficient.

(2) SECOND EMBODIMENT

Description will now be made of a chemical composition of base steel sheet to undergo electroplating or chemical treatment according to a second embodiment of the present invention. Also in the second embodiment, the contents of elements in the steel are expressed simply by percent (%) which, however, should all be construed to mean "in percent by mass (mass %)".

(Al: not Less than 0.1% and Under 3%)

In this embodiment, as in the first embodiment, steels with an Al content of not less than 0.1% are used. The reason is as follow: So long as the Al content is under 0.1%, because the surface-segregated amount of Al is low, there are not much of problems in the electrocoating adhesion and the unevenness of electroplated coating or chemical treatment coating, or the external appearance, and AlN is not formed, either. Also in this embodiment, with a view to securing a strength-ductility balance, preferably, the chemical composition contains retained austenite, and if the Al content is under 0.1%, the retained austenite is unstable; therefore, with a view to obtaining a better strength-ductility balance of the steel sheet, it is required that not less than 0.1% of Al should be contained in the steel sheet. Note that in a steel sheet with an Al content of not less than 3.0 mass %, even if AlN is formed in the surface layer of a steel sheet, the surface segregated Al is formed in large amounts during annealing, making it difficult to secure a better coating adhesion despite the best efforts that could be made to improve the method for forming a nitride layer; therefore, the Al content in the steel is set under 3.0%.

(One or Two Kinds Out of not Less than 0.1% of Si and not Less than 0.5% of Mn)

For the same reason as in the first embodiment, one or two kinds out of Si and Mn are set in the ranges mentioned above. (One or two kinds selected out of not less 0.01% and not more than 1% of Mo, and not less than 0.005% and not more than 0.2% of Nb)

For the same reason as in the first embodiment, one or two kinds out of Mo and Nb are set in the ranges mentioned above. (Not less than 0.01% and not more than 0.5% of Cu, not less than 0.01% and not more than 1% of Ni, not less than 0.01% and not more than 1% of Mo)

By adding Cu, Ni and Mo, the coating adhesion of the steel sheet is improved. The mechanism of improving the electrocoating adhesion and chemical properties by adding Cu, Ni and Mo has not been clarified. But, the present inventors have confirmed that when those elements are added together, but not singly, the internal oxidation of Al is promoted during annealing, and therefore Al is prevented from segregating in the surface, thus improving the coating adhesion.

With regard to other components, considering production cost and also workability when a steel sheet is used as an automotive steel sheet, preferably, 0.005~0.25% of C, 0.001~0.20% of P, and 0.0001~0.10% of S should be contained. Besides these elements, to control a strength-ductility balance of the steel sheet, it is permissible to contain not more than 0.15% of Ti, not more than 1% of Cr and 0.001~0.005% of B. The rest consists of Fe and unavoidable impurities.

Description will be made of the AlN precipitate layer formed in the surface layer of a steel sheet, which is an important point of this embodiment.

In this embodiment, as in the first embodiment, the AlN precipitate layer is formed in the surface layer of the steel sheet, and fixed in the form of nitride in the matrix, the Al in the steel of the surface layer is prevented from diffusing into the surface layer of the steel sheet in annealing or acid cleaning.

Though the reason has not been clarified, it has been confirmed that the presence of the AlN precipitate layer has the effect of inhibiting Si and Mn as readily oxidizable elements other than Al from segregating at the surface of the steel during annealing. Therefore, even with steels which contain relatively large amounts of Si and Mn and which tend to cause a poor coating adhesion or bare spots, the presence of an AlN precipitate layer secures better electroplated coating properties and coating adhesion.

The cross section of a steel sheet having an AlN precipitate layer formed in the surface layer is the same as shown in FIG. 1 of the first embodiment (the result observed by an electron microscope (SEM), and the state of presence of Al by EPMA is the same as shown in FIG. 2 of the first embodiment. Therefore, the Al exists as nitride in a columnar or angular form and is distributed in a region 10~20 µm deep from the interface of the steel matrix, and it is obvious that in that portion of the region where AlN did not precipitate out, there is not much of solid solution of Al. This region corresponds to the AlN precipitate layer. Therefore, the solid solution of Al is inhibited from diffusing from this region to the surface during annealing, and therefore the coating adhesion does not deteriorate. It is understood that in an area much deeper than that region, the presence of nitride is not recognized, but Al exists mostly in a solid solution phase.

For the same reason as in the first embodiment, in this embodiment, the thickness of the AlN precipitate layer is preferably not less than 1 µm and not more than 100 µm.

Description will now be made of a preferred method for manufacturing a coated steel sheet according to the present invention. Like with an ordinary steel sheet, this steel sheet (a base sheet for an electroplating or chemical treatment process) is manufactured by heating and holding a cast steel slab (continuously-cast slab for example) for a predetermined time and having the slab go through a hot-rolling process or, if necessary, further subjecting it to a cold-rolling process. In this invention, however, in order to prevent Al from segregating at the surface layer in the annealing process before electroplating or chemical treatment, an AlN precipitate layer is previously formed in the surface layer of the steel sheet before annealing or after acid cleaning.

The present inventors, to form this AlN precipitate layer, carried out the above-mentioned heating and holding of the cast steel slab in an atmosphere containing not less than 1 vol % and not more than 20 vol % of $O_2$ and not less than 70 vol % of $N_2$ like in the first embodiment.

By carrying out the above-mentioned heating and holding of the cast steel slab in an $N_2$-containing atmosphere at a raised holding temperature and for a prolonged holding time, the Al in the surface layer of the steel slab can be nitirided. In this case, if the Al content is high in the cast slab, the heating and holding time necessary for nitridation is prolonged accordingly. Regarding steels with varying Al contents, investigation was made into the effects that heating and holding time and temperature before hot rolling have on the electroplated coating adhesion and the chemical properties, and details are described as follows.

A cast steel slab of a composition containing 0.1~3% of Al, 0.5% of Si and 2.2% of Mo was heated and held in an atmosphere of 70 vol % of $O_2$ and the rest consisting of of $N_2$ was hot-rolled into a steel sheet of a thickness of 2.8 mm. The oxide scale on the surface of an obtained hot-rolled steel sheet was removed by acid cleaning, and then the steel sheet was cold-rolled to a 1.6 mm thickness, and annealed at 810~825° C., overaged at 400~460° C., and then subjected to electro-galvanizing and Zn phosphating by well-known methods, respectively.

An obtained electro-galvanized steel sheet was evaluated in coating adhesion by an OT bending test as follows.

In the OT bending test, an electro-galvanized steel sheet was folded in twofold without leaving no gap with the side under evaluation of the coating adhesion facing outside, a cellophane tape was attached to the folded portion and peeled off, and the amount of the coating adhering to the cellophane tape was visually inspected. Evaluation was made according to the criterion 1.

(Criterion 1):
○: The coating did not peel off.
Δ: The coating slightly peeled off to a level of no problem.
X: The coating peeled off conspicuously.

An obtained zinc-phosphated steel sheet was visually inspected to see if there was any unevenness in adhesion of the zinc phosphate film, and evaluated according to criterion 2 as follows.

(Criterion 2)
○: The coating weight is free of unevenness.
Δ: The coating weight was slightly uneven but no problem.
X: The coating weight was conspicuously uneven.

In those evaluations, if those which were evaluated as ○ or Δ in both of electroplated coating adhesion and chemical properties are classified as ○ and those which were evaluated as X in one or both of electroplated coating adhesion and chemical properties are classified as X, then the evaluation results of this embodiment are the same as those in FIGS. 3A to 3D showing the evaluation of the coating adhesion in the first embodiment.

Therefore, as is obvious from FIGS. 3A to 3D, by heating and holding a cast steel sheet before hot rolling under the conditions that the heating and holding temperature, the heating and holding time and the Al content all meet Eq. (1), in other words, under the conditions that fall within the upper area of the border line between the ○-mark area and the X-mark area, an electro-galvanized steel sheet can be manufactured with excellent coating adhesion.

$$\{\text{Heating \& holding temperature (° C.)}-(1050+25\text{Al})\} \times \text{heating \& holding time (min)} \geq 3000 \quad (1)$$

where Al denotes the Al content (mass %) in the steel.

It could be confirmed that when Eq. (1) is satisfied, the Al precipitate layer is formed in the surface layer of the steel sheet.

As has been described, with a cast steel sheet of a composition that contains not less than 0.1% and under 3% of Al, by heating and holding before hot rolling under conditions that meet Eq. (1) in an atmosphere containing not less than 1 vol % and not more than 20 vol % of $O_2$, a steel sheet having an AlN precipitate layer formed in the surface layer can be manufactured, and even with a steel sheet containing readily oxidizable elements such as Si and Mn, besides Al, it is possible to achieve better electro-galvanized coating adhesion and chemical properties.

A hot-rolled steel sheet that has been hot-rolled after heated and held under the above-mentioned conditions is, after acid cleaning or after acid cleaning, cold rolling, and annealing, subjected to electroplating and chemical treatment processes.

In this embodiment, acid cleaning after hot rolling is done to remove the oxide scale formed on the surface, but acid-cleaning conditions are not specified. However, because an AlN precipitate layer needs to remain, consideration is required to prevent the matrix from dissolving in large amounts during acid cleaning. The acid to be used for cleaning is preferably hydrochloric acid, but other acids such as sulfuric acid may be used. The acid concentration is preferably 1~20 mass %. To prevent the matrix from dissolving in large amounts, an inhibitor (dissolution inhibitor) may be added in the acid cleaning liquid.

In this embodiment, cold rolling is carried out when necessary to control the mechanical properties and the sheet thickness of a final product. Cold rolling is preferably performed with a draft of not less than 30% to promote recrystallization in subsequent annealing. Note that when the draft is not less than 80%, load on the rolling mill is so large that rolling becomes difficult, so that the draft is preferably 30~80%.

Further in this embodiment, annealing may be carried out by a well-known continuous annealing method. Annealing may be performed not only on cold-rolled steel sheets but also on hot-rolled steel sheets. To achieve a better balance between strength and ductility of steel sheet, when both annealing by a continuous annealing method and electro-galvanizing are carried out continuously, it is preferable to perform averaging at 350~500° C. for two minutes or longer after intercritical heating, and while having bainite transformation to progress, make the carbon segregate in the austenite, and subsequently carry out electro-galvanizing. When electro-galvanizing is carried out after primary annealing, cooling, acid cleaning, and secondary annealing, it is preferable to perform intercritical heating by primary annealing, then quenching the steel sheet down to 300° C. or lower at a rate of 40° C./s or higher to thereby form a hardened structure composed of ferrite/martensite phases, and just before galvanizing, and then tempering the steel sheet by heating to 725~840° C. and cooling at a rate of 5° C./s or higher to thereby form a composite structure ferrite, tempered martensite and retained austenite.

The technology for forming the AlN precipitate layer, which has been described, is to control conditions for heating and holding before hot rolling. However, to manufacture a coated steel sheet according to this embodiment, this technology for controlling the heating and holding conditions may not be adopted. For example, the above-mentioned coated can be manufactured by a method of annealing in an atmosphere of nitriding elements, such as an $H_2$—$N_2$ system gas, mixed with trace amounts of CO and $NH_3$ in the annealing process.

As electroplating applied to a steel sheet for coating according to this embodiment, electro galvanized coating, in which the chief component is Zn, is most suitable. For example, besides pure-zinc electroplating, zinc-alloy electroplating that contains elements, such as Fe, Ni, Co and Mo, may be cited. In addition, it is possible to use a zinc-based electroplated coating which has inorganic compounds or organic compounds dispersed or separated out in a zinc-based electroplated coating. As a chemical treatment process, an ordinary method, such as zinc-phosphating may be applied.

A coated steel sheet according to this embodiment, though subjected to electroplated coating or chemical treatment, the coating adhesion, coating weight and crawling of the electroplated coating, and the coarsening of crystalline grains by chemical treatment are improved to a great extent.

EMBODIMENT

A cast steel slab of a composition shown in Table 7 was heated and held in a heating furnace under the conditions shown in Table 8 and subsequently hot-rolled to a thickness of 2.8 mm and wound up in a coil at 540~600° C. After this, the skin scale was removed from the strip by acid cleaning. Some of acid-cleaned hot-rolled steel sheet is cold-rolled into a cold-rolled strip with a thickness of 1.6 mm, annealed at 800~850° C., and overaged at 400~500° C., and cooled.

An obtained hot-rolled strip or cold-rolled strip as a base sheet was coated by any one of Zn phosphating, pure-zinc electroplated coating, electro zinc-nickel alloy coating, and electro zinc-iron coating by a well-known method. Base sheets were measured to determine the thickness of the AlN precipitate layer and the solid solution rate of Al in the AlN precipitate layer. An electroplated steel sheet was subjected to the OT bending test mentioned above, and the coating adhesion was evaluated. The electroplated coating property or the chemical properties was decided from external appearance by visual examination to see if there was external unevenness, such as unevenness of coating weight, and evaluated according to Criterion 2.

As for mechanical properties, JIS-specified No.5 tension test specimens were taken from the strip, and tensile test was conducted to measure tensile strength (TS (MPa)) and elongation (El (%)). From measured values, TS×El was obtained, and if the value was 20,000 (MPa·%) or larger, this was decided to show a favorable strength-ductility balance of the steel sheet, and the mechanical properties were evaluated as good.

From FIG. 8, it is obvious that in embodiments of the invention in which electroplating was performed, steel sheets are superior in the coating adhesion and the external appearance, and exhibit excellent mechanical properties. It is also evident that steel sheets in embodiments of the invention in which chemical treatment was carried out show superb external appearance and offers favorable mechanical properties.

TABLE 7

| Steel Symbol | Chemical Composition (mass %) | | | | | | | | | | | Remarks |
|---|---|---|---|---|---|---|---|---|---|---|---|---|
| | C | Si | Mn | P | S | Al | Ti | Nb | Mo | Cu | Ni | |
| A | 0.080 | 0.60 | 2.0 | 0.010 | 0.008 | 0.4 | | | | | | Proper Ex. |
| B | 0.100 | 0.03 | 1.6 | 0.010 | 0.007 | 1.6 | | | | | | Proper Ex. |
| C | 0.070 | 0.20 | 1.6 | 0.010 | 0.008 | 0.2 | | | | | | Proper Ex. |
| D | 0.090 | 0.04 | 1.4 | 0.008 | 0.006 | 1.6 | 0.01 | 0.03 | 0.05 | | | Proper Ex. |
| E | 0.080 | 0.06 | 1.2 | 0.011 | 0.009 | 0.9 | 0.04 | | 0.1 | 0.2 | 0.1 | Proper Ex. |
| F | 0.060 | 0.03 | 1.7 | 0.00 | 70.006 | 0.03 | | | | | | Comparative Ex. |

TABLE 8

| Steel Sheet No. | Steel Symbol | Slab Heating & Holding Conditions | | | | Thickness Of AlN Ppt. Layer (μm) | Al Solid Soln. Pct. In AlN Ppt. Layer (%) *2 | |
|---|---|---|---|---|---|---|---|---|
| | | Ht. & Hld. Temp. (° C.) | Ht. & Hld. Time (min) | Value of LHS of Eq. (1) *1 | $O_2$ Concentration In Slab-Heating Atm. (vol %) | | | |
| 1 | A | 1200 | 30 | 4200 | 1.5 | 0.3 | 20 | Invent. Ex. 1 |
| 2 | A | 1200 | 40 | 5600 | 1.5 | 1 | 20 | Invent. Ex. 2 |
| 3 | A | 1250 | 40 | 7600 | 1.5 | 4 | 20 | Invent. Ex. 3 |

TABLE 8-continued

| | | | | | | | | |
|---|---|---|---|---|---|---|---|---|
| 4 | A | 1250 | 40 | 7600 | 1.5 | 4 | 20 | Invent. Ex. 4 |
| 5 | A | 1250 | 40 | 7600 | 10 | 6 | 20 | Invent. Ex. 5 |
| 6 | A | 1250 | 40 | 7600 | 8 | 5 | 20 | Invent. Ex. 6 |
| 7 | B | 1250 | 40 | 7600 | 10 | 3 | 22 | Invent. Ex. 7 |
| 8 | C | 1250 | 40 | 7600 | 1.5 | 5 | 10 | Invent. Ex. 8 |
| 9 | D | 1250 | 40 | 7600 | 1.5 | 4 | 22 | Invent. Ex. 9 |
| 10 | E | 1250 | 40 | 7600 | 15 | 6 | 21 | Invent. Ex. 10 |
| 11 | A | 1250 | 40 | 7600 | 0.1 | 0 | — | Comp. Ex. 1 |
| 12 | F | 1250 | 40 | 7600 | 3 | 0 | — | Comp. Ex. 2 |
| 13 | A | 1200 | 40 | 5600 | 1.5 | 2 | 20 | Invent. Ex. 11 |
| 14 | A | 1200 | 40 | 5600 | 1.5 | 2 | 20 | Invent. Ex. 12 |
| 15 | A | 1050 | 30 | −300 | 2 | 0 | — | Comp. Ex. 3 |

| | | | Evaluation | | | |
|---|---|---|---|---|---|---|
| Steel Sheet No. | Kind Of Base Sheet | Coating/Chemical Conv. Kind *3 | External Appearance | Coating Adhesion | Mech. Char. | |
| 1 | Cold | Zn | Δ | Δ | Good | Invent. Ex. 1 |
| 2 | Cold | Zn | ○ | ○ | Good | Invent. Ex. 2 |
| 3 | Cold | Zn—Ni | ○ | ○ | Good | Invent. Ex. 3 |
| 4 | Cold | Zn—Fe | ○ | ○ | Good | Invent. Ex. 4 |
| 5 | Cold | Zn phos Ch. Treat | ○ | — | Good | Invent. Ex. 5 |
| 6 | Cold | Zn | ○ | ○ | Good | Invent. Ex. 6 |
| 7 | Cold | Zn | ○ | ○ | Good | Invent. Ex. 7 |
| 8 | Cold | Zn | ○ | ○ | Good | Invent. Ex. 8 |
| 9 | Cold | Zn | ○ | ○ | Good | Invent. Ex. 9 |
| 10 | Cold | Zn | ○ | ○ | Good | Invent. Ex. 10 |
| 11 | Cold | Zn | X | X | Good | Comp. Ex. 1 |
| 12 | Cold | Zn | ○ | ○ | No Good | Comp. Ex. 2 |
| 13 | Hot | Zn | ○ | ○ | Good | Invent. Ex. 11 |
| 14 | Hot | Zn phos Ch. Treat | ○ | — | Good | Invent. Ex. 12 |
| 15 | Cold | Zn | X | X | Good | Comp. Ex. 3 |

*1: LHS value of Eq.(1) = {ht. & hld. temp. − (1050 + 25Al)} × ht. & hld. time
*2: Al solid soln. (%) = Al concentration in matrix of AlN ppt. Layer/Al concentration at center in sheet thickness direction × 100
*3: Zn: pure zinc electro coating; Zn—Ni: Zn—Ni electro coating; Zn—Fe: Zn—Fe electro coating (3) THIRD EMBODIMENT Description will be made of a chemical composition of a high-strength steel sheet and a base sheet for a high-strength hot-dip galvanized steel sheet according to a third embodiment of the present invention. Also in the third embodiment, the contents of elements in the steel are expressed simply by percent (%) which, however, should all be construed to mean "in percents by mass (mass %)".

(Not Less than 0.1% and Under 3.0% of Al)

For the same reason as in the first embodiment, the Al content is in the above-mentioned range.

(C: 0.03~0.25%)

The C content needs to be not less than 0.03% to secure a desired structure. However, a large amount of C degrades weldability, and therefore the C content should be limited to more than 0.25%.

(Si: 0.001~1.0%)

To obtain desired strength and structure, not less than 0.001% of Si is added. If Si, like with Al, is present as an internal oxide in the surface layer, the problem of surface treatability can be avoided. However, If the Si content in the steel is over 1.0%, even though Si is present in the surface layer but as its oxide in an inner area of the steel sheet, the post-painting corrosion resistance of the steel sheet which was coated is low. For this reason, the upper limit of Si content is 1.0%.

(Mn: 0.5~3.0%)

To obtain a desired strength, Mn is added in an amount of 0.5% or more. However, if the added amount is over 3%, the weldability deteriorates, so that the Mn content is limited to not more than 3.0%.

(P: 0.001~0.10%)

Though P is an element which is used to achieve high strength without aggravating deep drawing property; however, the addition of an excessive amount of P delays a galvannealing reaction or deteriorates secondary fabrication embrittlement, so that the P content is limited to not more than 0.10%. The lower limit is 0.001%, a level of unavoidable impurity content.

Steel sheets according to the present invention, in addition to the indispensable elements mentioned above, may contain the following components where necessary.

(Mo: 0.01~1.0%, Nb: 0.005~0.2%)

Mo and Nb reduce the grain size of the matrix structure and delay the recrystallization, to thereby promote the internal oxidation of Al in the temperature rising process, and are preferably added to obtain better coating property and coating adhesion. When Mo and Nb are added together, however, if the Mo content is over 1.0%, the surface properties of a hot-rolled steel sheet shows a tendency to deteriorate, or if the Mo content is under 0.01%, the intended effect is less likely to be obtained. On the other hand, when Nb is added at a content of over 0.2%, the hardness tends to rise and the ductility tends to deteriorate, but if the content is under 0.005%, the effect is small. Therefore, preferably, the Mo content is 0.01~1.0%, and the Nb content is 0.005~0.2%. (Cu: 0.01~0.5% ; Ni: 0.01~1.0% ; Mo: 0.01~1.0%)

Cu, Ni and Mo are elements desirable for obtaining better coating adhesion, and only when they are added together, the internal oxidation is promoted during annealing, and therefore they are prevented from segregating in the surface, thus improving the coating adhesion. However, when they are in large amounts, there is a tendency for the surface properties of the steel sheet to deteriorate, so that their added amounts need to meet the conditions: 0.01~0.5% of Cu, 0.01~1.0% of Ni, and 0.01~1.0% of Mo.

As for other chemical components, considering an application as steel sheets for automobiles, to improve the strength-ductility balance, other elements may be added when necessary in the following ranges: not more than 0.15% of Ti, not more than 1% of Cr, and 0.001~0.005% of B.

The rest other than the above-mentioned elements are preferably Fe and unavoidable impurities.

Description will next be made of the internal oxide layer to be possessed by a high strength steel sheet and a high-strength hot-dip galvanized steel sheet according to this embodiment.

In this embodiment, an oxide layer needs to be formed not in the surface of a steel sheet, but as a so-called internal oxide layer right below the surface of the matrix. As the amount of the oxide existing in the surface of a steel sheet increases, not only the surface-treatability and the coating adhesion but also the weldability and post-painting corrosion resistance deteriorate. The region right below the surface (surface layer) at which the internal oxide layer preferably extends generally in a range of 0.1~100 μm from the surface of the steel sheet. If the thickness of the region where the Al oxide exists is less than 0.1 μm, the formed amount of the oxide is so little that the surface oxidation of Al cannot be inhibited. On the other hand, if the range is greater than 100 μm, there is a worry that the mechanical properties of the steel sheet itself deteriorates.

By making the internal oxidation take place, the Al oxide not only exists as the internal oxidation layer in the crystalline grains right below the surface of the matrix, but also comes to exist in large amounts in the grain boundaries. The Al oxides existing at the grain boundaries have the effect of inhibiting the corrosion reaction liable to progress from the grain boundaries. The oxides existing in the grains also have the effect of inhibiting the corrosion reaction from progressing from the grain boundaries into the grains. The details of this mechanism are unknown. The above-mentioned effects are enhanced by coexistence of other oxides; therefore, to have the Al oxides coexist with oxides of Fe, Si, Mn and P or the like is desirable for the improvement of the corrosion resistance. Among the oxides of those elements are $SiO_2$, MnO, $FeSiO_3$, $Fe_2SiO_4$, $MnSiO_3$, $Mn_2SiO_4$ and $P_2O_5$.

The coexistence of those oxides contributes to the outstanding coating adhesion during press working. It is presumed that the oxide layers existing in adequate amounts serve to absorb compressive stresses in press working. Therefore, the presence of an Al oxide and other oxides is effective in additionally improving the coating adhesion.

Moreover, the presence of the Al oxide as the internal oxide layer secures an improved spot welding property. The reason is considered as follows. Because the Al oxide that worsens the weldability is fixed as the oxide in the steel and does not exist in the surface of the steel sheet, a substantive amount of Al solid solution is decreased and the weldability is thereby improved.

As has been described, in a steel sheet according to this embodiment, the internal oxide layer is required to exist right below the surface of the steel sheet, and to obtain the above-mentioned effects, the amount of oxides needs to be 0.01 g/m² for each side. However, when the amount of oxides is over 1.0 g/m², the internal oxidation progresses so much as to deteriorate the surface treatability and the coating adhesion, and moreover the roughened surface worsens the external appearance and degrades the corrosion resistance.

Note that the amount of the internal oxides can be known by measuring the amount of oxygen in the steel; however, if a coated layer has already been formed, such as a coating layer, then the amount of oxygen in the steel is measured after the coated surface is removed. As for a method for removing the coating layer, it is possible to use a solution consisting of an aqueous solution of 20 wt % of NaOH and 10 wt % of triethanolamine and an aqueous solution of 35 wt % of $H_2O_2$ mixed in a volume ratio of 195:7 or a dilute HCl solution containing an inhibitor. Or, other acid or alkali may be used. Note that attention should be taken to prevent the surface of the steel sheet from oxidizing after the coating layer has been removed. When measuring the amount of oxygen in the steel, the amount of oxygen in the base sheet for the steel sheet needs to be subtracted; therefore, after the coating layer has been removed, the amount of oxygen of only the surface layer is calculated by subtracting the amount of oxygen existing in the steel obtained from a specimen, the surfaces of both sides of which have been removed by 100 μm or more from the surface by mechanical grinding, and then by converting the calculated amount of oxygen into that per unit area, the internal oxide amount is obtained. The amount of oxygen in the steel can be obtained by measuring by "Impulse Furnace Melting-Infrared Absorption", for example. The kinds of oxides can be identified by using extraction replicas of the cross section of the steel sheet, and by analyzing them by TEM observation and EDX. If the amount of oxides formed is so small and it is difficult to identify, the $Br_2$-methanol method may be used to extract and ICP analysis may be employed.

The above-mentioned internal oxide layer can be formed by setting a coiling temperature (CT) after hot-rolling at a high temperature of not lower than 640° C., or by annealing on a continuous annealing line (CAL) or on a continuous hot-dip galvanizing line (CGL), and in this process by setting the dew point (DP) of the atmosphere in the annealing furnace on a rather higher side. In the former case, the internal oxide layer is formed by oxygen supplied from the skin scale, or in the latter case, the internal oxide layer is formed by oxygen formed when $H_2O$ in the atmosphere decomposes at the surface of the steel sheet. Therefore, when the coiling temperature CT after hot rolling has to be low, the internal oxides may be formed in the annealing furnace. Above all else, Al is liable to form internal oxides, so oxidation occurs even at an ordinary dew point of about (DP=−40~−30° C.), and even when an added amount is as much as close to 2%, surface segregation can be impeded sufficiently. However, when the dew point is below −50° C., internal oxidation becomes less liable to occur. Therefore, when a steel sheet is coiled at a high coiling temperature CT, the dew point of the atmosphere in annealing matters little, but when a steel sheet is coiled at a low CT, the dew point preferably not lower than −45° C., and more preferably not lower than −40° C. With regard to Si, Mn and P in the surface layer, internal oxides of those elements are formed by setting a high CT or by controlling the dew point in continuous annealing.

A high strength steel sheet according to the present invention can be manufactured by using a high CT or by controlling the dew point in continuous annealing as described above. Moreover, if a high strength steel sheet according to the present invention is hot-dip galvanized, a hot-dip galvanized steel sheet according to this embodiment can be manufactured.

Next, description will be made of suitable conditions for annealing and hot-dip galvanizing when manufacturing steel sheet according to this embodiment.

With regard to annealing conditions on a continuous annealing line (CAL), it is preferable from a viewpoint of obtaining high strength that, after recrystallization is made to occur by heating the steel sheet to an intercritical temperature (α+γ), the steel sheet is overaged at 350~500° C. for two minutes or longer to make C segregate in the austenite, and bainite transformation is made to occur. When hot-dip galvanizing a steel sheet, hot-dip galvanizing is carried out on a steel sheet on which recrystallization and averaging have been carried out, or after the above-mentioned intercritical annealing has been done on a continuous hot-dip galvanizing line (CGL), subsequently a hot-dip galvanizing process may be performed. In the category of hot-dip galvanized steel sheets, a hot-dip galvanized steel sheet featuring high strength and high ductility can be obtained by performing the above-mentioned intercritical annealing on a steel sheet on a CAL line, quenching 300° C. or lower at a rate of 40° C./sec or higher to produce a hardened structure consisting of ferrite and martensite, and then again annealing the steel sheet at 725~840° C. on the CGL line and cooling at a rate of 5° C./sec to obtain a steel sheet of a composite structure of ferrite, tempered martensite and retained austenite, and subsequently hot-dip galvanizing the steel sheet, which is the so-called two-step annealing method.

As the annealing furnaces for CAL and CGL, all radiant heating tube (RTH) furnaces of so-called full-reducing atmosphere may be used. For the temperature-rising process, it is possible to use a non-oxidizing-atmosphere heating furnace (NOF) or a direct-firing furnace (DFF).

As for a method for applying this embodiment to a hot-dip galvanized steel sheet, a well-known method may be used. For example, preferably, the bath temperature is 440~500° C., and the Al concentration in the bath is 0.10~0.20% when a galvannealing process is carried out, or about 0.14~0.24% when a galvannealing process is not carried out. If the Al concentration is too low, the coating adhesion is inferior in both cases mentioned above. On the other hand, if the Al concentration is too high, the weldability is poor when the galvannealing process is not executed or the galvannealing reaction is delayed when the galvannealing process is carried out. To improve the corrosion resistance, Mg may be added to the galvanizing bath. The coating weight is not specified, but from a viewpoint of securing the corrosion resistance and controlling the coating weight, the coating weight is preferably not less than 10 g/m² or from a viewpoint of workability, the coating weight is preferably not more than 120 g/m².

Following hot-dip galvanizing, a galvannealing process may be performed if necessary. The temperature at which the galvannealing process is carried out is preferably in a range of 460~550° C. At under 460° C., the galvannealing reaction progresses slowly, but at 550° C. or higher, excess galvannealing occurs, and a hard and brittle Zn—Fe galvanneal layer is formed so much at the interface between the coating layer and the matrix, thus not only deteriorating the coating adhesion, but decomposing the retained austenite layer and aggravating the strength-ductility balance. Meanwhile, when the Fe content in the coating layer after the galvannealing process is under 7%, a soft Zn—Fe galvanneal layer is formed at the surface of the coating layer, thereby worsening the slidablity. On the other hand, the Fe content of over 15% is not preferable because the hard and brittle Fe—Zn galvanneal layer is formed at the interface of the matrix in the coating layer, lowering the coating adhesion.

A high strength steel sheet according to this embodiment may not only be hot-dip galvanized but also may be coated with hot-dip Zn-5% Al coating, hot-dip Zn-55% Al coating, hot-dip Al coating, or the like. The kind of a steel sheet to which this embodiment is applied, whether cold-rolled or hot-rolled, does not matter so long as desired mechanical properties can be obtained.

EMBODIMENT 1

A steel slab of a chemical composition shown in Table 9 was heated at 1150° C. for 25 minutes in a heating furnace, then hot-rolled to a thickness of 2.8 mm, and coiled at 450~780° C. to obtain a hot-rolled strip. Subsequently, with the skin scale removed by acid cleaning, the strip was cold-rolled to a thickness of 1.4 mm, and subjected to a continuous annealing annealed at 800~850° C. for recrystallization, and overaged at 400~500° C. to thereby finish a cold-rolled sheet.

This cold-rolled strip was further subjected to various kinds of coating, such as electro-galvanizing, electro Zn—Ni electroplating or Zn phosphating, and the steel sheet was evaluated in external appearance, coating adhesion (only for electroplated sheets), and corrosion resistance (only for Zn-phosphated sheets). The electroplated coating weight was 20 g/m² and the chemical treatment weight was 2 g/m².

TABLE 9

| Steel No. | Chemical Composition (mass %) | | | | | | | | | Remarks |
| --- | --- | --- | --- | --- | --- | --- | --- | --- | --- | --- |
| | C | Si | Mn | P | Al | Cu | Ni | Mo | Nb | |
| 1 | 0.08 | 0.01 | 1.6 | 0.01 | 2.0 | — | — | — | — | Inventive Steel |
| 2 | 0.09 | 0.3 | 1.7 | 0.009 | 1.5 | — | — | — | — | Inventive Steel |
| 3 | 0.10 | 0.6 | 1.8 | 0.03 | 0.4 | — | — | — | — | Inventive Steel |
| 4 | 0.07 | 0.1 | 1.4 | 0.0012 | 1.3 | 0.2 | 0.1 | 0.1 | — | Inventive Steel |
| 5 | 0.11 | 0.2 | 1.9 | 0.0013 | 1.8 | — | — | 0.05 | 0.03 | Inventive Steel |
| 6 | 0.06 | 1.6 | 1.9 | 0.02 | 0.2 | — | — | — | — | Comparative Steel |
| 7 | 0.075 | 0.8 | 1.8 | 0.011 | 0.01 | — | — | — | — | Comparative Steel |

The properties of steel sheets obtained as described are evaluated as follows.

External appearance: Bare spots or the uneven adhesion were observed visually, and specimens without flaws are decided as good (○).

Coating adhesion: Electroplated steel sheets were subjected to a ball impact test, and then a cellophane tape was attached to the processed parts and peeled off. Whether or not the coating layer was peeled off was visually observed, and "without bare spots" was classified as ○, "there are somewhat bare spots" was classified as Δ, and "bare spots occurred conspicuously" was classified as X. Corrosion resistance: Zn-phosphated steel sheets were electrodeposited, a cross was engraved with a knife, and test specimens were dipped in a 5% NaCl or 55° C. salt water for 240 hours, taken out and dried, and tape peeling test was performed on cross-cut portions, and the peeling width was measured.

maximum tensile load in a cross joint tensile test (CTS) according to JIS Z3137 were measured. Those test specimens for which ductility ratio (CTS/TSS) was not less than 0.25 and the tensile load (TSS) was not less than the standard tensile shear load (1162N) for a thickness of 1.4 mm were classified as excellent (○), and those not meeting the above conditions were classified as inferior (X).

On cold-rolled steel sheets before sent to coating, the amounts of internal oxides were measured by the above-mentioned method, and the internal oxides were identified. If an oxide existed in a range up to 0.1 μm from the surface, such a case was determined as "presence of oxide".

The test results are shown en bloc in Table 10. As is clear from this Table, high tension steel sheets according to the present invention, regardless of large contents of Al and Si, invariably exhibit excellent surface treatability, coatability, spot-weldability, and post-painting corrosion resistance.

TABLE 10

| Ex. | No. | Steel No. | Hot-Roll. CT | CAL Annl. Temp. (° C.) | CAL Dew Point (° C.) | Oxide In Surf. Layer | Al Oxide | Other Oxides | Amt. Of Oxide (G/m$^2$) |
|---|---|---|---|---|---|---|---|---|---|
| Embodied Ex. | 1 | 1 | 450 | 800 | −40 | Present | Present | MnO | 0.01 |
| | 2 | 1 | 450 | 800 | −40 | Present | Present | MnO | 0.01 |
| | 3 | 1 | 450 | 800 | −40 | Present | Present | MnO | 0.01 |
| | 4 | 2 | 450 | 800 | −30 | Present | Present | SiO$_2$, MnSiO$_3$ | 0.02 |
| | 5 | 3 | 450 | 800 | −30 | Present | Present | SiO$_2$, MnSiO$_3$, P$_2$O$_5$ | 0.02 |
| | 6 | 4 | 450 | 800 | −30 | Present | Present | SiO$_2$, MnSiO$_3$, P$_2$O$_5$ | 0.02 |
| | 7 | 5 | 450 | 800 | −30 | Present | Present | SiO$_2$, MnSiO$_3$, P$_2$O$_5$ | 0.02 |
| | 8 | 1 | 780 | 800 | −40 | Present | Present | MnO | 1.2 |
| Comp. Ex. | 1 | 2 | 450 | 800 | −60 | Absent | Absent | Absent | 0 |
| | 2 | 3 | 450 | 800 | −60 | Absent | Absent | Absent | 0 |
| | 3 | 6 | 450 | 800 | −5 | Present | Present | SiO$_2$, MnSiO$_3$, Mn$_2$SiO$_4$, P$_2$O$_5$ | 0.3 |
| | 4 | 7 | 450 | 800 | −30 | Present | Absent | SiO$_2$, MnSiO$_3$, Mn$_2$SiO$_4$, P$_2$O$_5$ | 0.02 |

| Ex. | No. | Coating | External Appearance | Coating Adhesion | Corr. Resist. (Corr. Peel-Off Width) (mm) | Weldability |
|---|---|---|---|---|---|---|
| Embodied Ex. | 1 | Electro Galv. | ○ | ○ | — | ○ |
| | 2 | Zn—Ni E.P. | ○ | ○ | — | ○ |
| | 3 | Zn phos. Ch. Treat. | ○ | — | ○(2.1) | ○ |
| | 4 | Zn phos. Ch. Treat. | ○ | — | ○(2.3) | ○ |
| | 5 | Zn phos. Ch. Treat. | ○ | — | ○(1.6) | ○ |
| | 6 | Zn phos. Ch. Treat. | ○ | — | ○(1.8) | ○ |
| | 7 | Zn phos. Ch. Treat. | ○ | — | ○(3.1) | ○ |
| | 8 | Zn phos. Ch. Treat. | ○ | — | Δ(3.8) | ○ |
| Comp. Ex. | 1 | Zn phos. Ch. Treat. | Uneven Adhesion | — | X(5.4) | X |
| | 2 | Zn phos. Ch. Treat. | Uneven Adhesion | — | X(6.5) | X |
| | 3 | Zn phos. Ch. Treat. | Slightly Uneven Adhesion | — | X(6.4) | ○ |
| | 4 | Zn phos. Ch. Treat. | ○ | — | X(8.0) | ○ |

Those with a peeling width of less than 3.5 mm were classified as good (○), those with a width of 3.5 mm–under 4 mm were classified as rather good (Δ), and those with a width of not less than 4 mm were classified as bad (X).

For cold-rolled steel sheets yet to be coated, the weldability was evaluated as follows.

Weldability test: Two test specimens were spot-welded together by using a dome-tipped 6-mm dia. welding electrode under conditions of electrode pressure of 4.3 kN, welding current of 8 kA, squeeze time for 25 cycles, setup time for 3 cycles, welding time for 13 cycles, and holding time for 1 cycle; subsequently, a maximum tensile load in a tensile shear test (TSS) according to JIS Z3136 and a

EMBODIMENT 2

A steel slab of chemical composition shown in Table 9 same as in Embodiment 1 was heated at 1150° C. for 25 minutes in a heating furnace, then hot-rolled to a thickness of 2.8 mm, and coiled at 450~780° C. to obtain a hot-rolled strip. After this, after its skin scale had been removed by acid cleaning, the strip was cold-rolled to a thickness of 1.2 mm, and then annealed under conditions shown in Table 12 in a CGL line, and subsequently hot-dip galvanized and subjected to a galvannealing process at 450~570° C. when necessary. The galvanizing bath temperature was held at 450~460° C., and as for the galvanizing bath composition, three different compositions-were used: in addition to a Zn bath with Al content of 0.13~0.20 mass %, a Zn bath with Al content of 5 mass % and a Zn bath with Al content of 4 mass % and Mg content of 1.5 mass % were used. The coating weight was adjusted to 50±5 g/m² for each single side by gas wiping.

An obtained hot-dip galvanized steel sheet was analyzed to determine the amount of internal oxide and identify oxides as in Embodiment 1. Also, the external appearance, the degree of galvannealing (only on galvannealed steel sheets), the coating adhesion and the corrosion resistance were examined.

Degree of galvannealing: The coating layer was dissolved in a mixed solution of an aqueous solution of 20 wt % of NaOH and 10 wt % of triethanolamine and an aqueous solution of 35 wt % of $H_2O_2$ mixed in a volume ratio of 195:7, and the solution is analyzed by ICP to measure the Fe content (%).

External appearance evaluation: The external appearance was visually checked to find bare spots or unevenness of coating.

Coating Adhesion:

(Non-alloyed hot-dip galvanized steel sheet) After put to a ball impact test, a cellophane tape was attached to a processed part of the steel sheet and the tape was peeled off. The test specimens were visually inspected to see if there is any peeled-off coating layer. Those specimens on which the coating did not peel off were classified as ○, those specimens with the coating peeled off a little were classified as Δ, and those specimens on which the coating peeled off conspicuously were classified as X.

(Alloyed hot-dip galvanized steel sheet) A test specimen to which a cellophane tape was attached was bent 90 degrees on the tape-attached side and bent back, and the tape was peeled off; subsequently, the amount of the peeled-off coating per unit length was measured in terms of counts of Zn by a fluorescent X-ray. The number of counts of Zn was evaluated referring to the criteria in Table 11. For measurement by fluorescent X-ray, an Rh bulb was used under condition of 40 kV and 50 mA for 120 sec.

Corrosion resistance: After the surfaces of a steel sheet manufactured by the above method were subjected to a chemical treatment process and an electrodeposition process, in test specimens was inscribed a cross with a knife, and a test specimen was put to a CCT test for a total of 50 cycles, one cycle consisting of a series of steps shown below, a tape-peel-off test was conducted on the cross-inscribed portions and the peeling-off width of the coating film was measured. A decision was given as follows: a case where the peeling-off width was under 4 mm was classified as good (○), a case where the width was 4 mm or larger was classified as defective (○).

One cycle consists of wetting (2 hrs)—salt water spray (2 hrs)—drying (1 hr)—wetting (6 hrs)—drying (2 hrs)—wetting (6 hrs)—drying (2 hrs)—low temperature (3 hrs).

A cold-rolled steel sheet yet to be galvanized was evaluated in terms of weldability as follows.

Two test specimens were spot-welded together by using a dome-tipped 6-mm-dia. Welding electrode under conditions of electrode pressure of 3.1 kN, welding current of 7 kA, squeeze time for 25 cycles, setup time for 3 cycles, welding time for 13 cycles, holding time for 1 cycle; subsequently, a maximum tensile load in a tensile shear test (TSS) according to JIS Z3136 and a maximum tensile load in a cross joint tensile test (CTS) according to JIS Z3137 were measured. Those test specimens for which the ductility ratio (CTS/TSS) was not less than 0.25 and the tensile load (TSS) was not less than the standard tensile shear load (8787N) for a thickness of 1.2 mm were classified as excellent (○), and those not meeting the above conditions were classified as inferior (X).

TABLE 11

| Rank | Fluores. X-Ray Count | Evaluation |
| --- | --- | --- |
| 1 | 0~500 | Good |
| 2 | Over 500~1000 | Good |
| 3 | Over 1000~2000 | Defective |
| 4 | Over 2000~3000 | Defective |
| 5 | Over 3000 | Defective |

The test results are shown en bloc in Table 12. As is clear from this Table, hot-dip galvanized steel sheets according to the present invention, regardless of no small contents of Al and Si, all exhibit excellent coating adhesion, spot-weldability, and post-painting corrosion resistance.

TABLE 12

| Ex. | No. | Steel No. | Hot-Roll. CT | CAL Annl. Temp. (° C.) | CAL Dew Point (° C.) | Galvannealing Temp. (° C.) | Oxide In Surf. Layer | Al Oxide | Other Oxides | Amt. Of Oxide (G/m²) |
| --- | --- | --- | --- | --- | --- | --- | --- | --- | --- | --- |
| Embodied Ex. | 9 | 1 | 450 | 800 | −40 | 500 | Present | Present | MnO | 0.01 |
| | 10 | 1 | 450 | 800 | −45 | 500 | Present | Absent | Absent | 0.006 |
| | 11 | 1 | 450 | 800 | −10 | 500 | Present | Present | MnO | 0.1 |
| | 12 | 1 | 450 | 800 | −40 | — | Present | Present | MnO | 0.01 |
| | 13 | 1 | 450 | 800 | −40 | — | Present | Present | MnO | 0.01 |
| | 14 | 2 | 450 | 800 | −30 | 510 | Present | Present | SiO₂, MnSiO₃, | 0.02 |
| | 15 | 3 | 450 | 800 | −30 | 530 | Present | Present | SiO₂, MnSiO₃, P₂O₅ | 0.02 |
| | 16 | 4 | 450 | 800 | −30 | 500 | Present | Present | SiO₂, MnSiO₃, P₂O₅ | 0.02 |
| | 17 | 5 | 450 | 800 | −30 | 500 | Present | Present | SiO₂, MnSiO₃, P₂O₅ | 0.02 |
| | 18 | 1 | 780 | 800 | −40 | 470 | Present | Present | MnO | 1.2 |
| Comp. Ex. | 5 | 1 | 450 | 800 | −60 | 500 | Absent | Absent | Absent | 0 |
| | 6 | 2 | 450 | 800 | −60 | 500 | Absent | Absent | Absent | 0 |
| | 7 | 3 | 450 | 800 | −5 | 510 | Absent | Absent | Absent | 0 |
| | 8 | 6 | 450 | 800 | −30 | 520 | Present | Present | SiO₂, MnSiO₃, Mn₂SiO₄, P₂O₅ | 0.3 |
| | 9 | 7 | 450 | 800 | −30 | 520 | Present | Absent | SiO₂, MnSiO₃, Mn₂SiO₄, P₂O₅ | 0.02 |

TABLE 12-continued

| Ex. | No. | Kind Of Coating | Degree Of Galvannealing (Fe %) | External Appearance | Coating Adhesion | Corr. Resist. (Corr. Peel-Off Width) (mm) | Weldability |
|---|---|---|---|---|---|---|---|
| Embodied Ex. | 9 | Alloyed Hot-Dip Galv. | 12 | ○ | ○ | ○(0.8) | ○ |
|  | 10 | Alloyed Hot-Dip Galv. | 10 | ○ | Δ | ○(0.86) | ○ |
|  | 11 | Hot-Dip Galv. | — | ○ | ○ | ○(0.9) | ○ |
|  | 12 | Hot-Dip Zn-5% Al Coating | — | ○ | ○ | ○(2.1) | ○ |
|  | 13 | Alloyed Hot-Dip Galv. | — | ○ | ○ | ○(2.1) | ○ |
|  | 14 | Alloyed Hot-Dip Galv. | 11 | ○ | ○ | ○(0.75) | ○ |
|  | 15 | Alloyed Hot-Dip Galv. | 9 | ○ | ○ | ○(1.4) | ○ |
|  | 16 | Alloyed Hot-Dip Galv. | 10 | ○ | ○ | ○(0.76) | ○ |
|  | 17 | Alloyed Hot-Dip Galv. | 12 | ○ | ○ | ○(0.7) | ○ |
|  | 18 | Alloyed Hot-Dip Galv. | 10 | Uneven And Rough | Δ | Δ (3.7) | ○ |
| Comp.Ex. | 5 | Alloyed Hot-Dip Galv. | 10 | Bare | X | X(4.8) | X |
|  | 6 | Alloyed Hot-Dip Galv. | 11 | Bare | X | X(5.1) | X |
|  | 7 | Alloyed Hot-Dip Galv. | 8 | Bare | X | X(4.1) | X |
|  | 8 | Alloyed Hot-Dip Galv. | 8 | ○ | ○ | X(4.2) | ○ |
|  | 9 | Alloyed Hot-Dip Galv. | 13 | ○ | ○ | X(4.3) | ○ |

INDUSTRIAL APPLICABILITY

In the automotive industry, for example, the use of high-tensile steel sheets is increasing rapidly with a view to reducing car weight for better fuel economy and improved crashworthiness. The high-tensile steel sheet has a steel composition including addition elements such as Si, Mn, Ti, Al and P. It is well known, however, that as the Si content is increased, an Si oxide film is formed on the surfaces of the steel sheet during annealing, thus deteriorating the steel properties, such as chemical properties, electro-galvanized coating adhesion, hot-dip galvanizability and coating adhesion. Above all else, the big problem is the inferior hot-dip galvanizability of Si-containing high-tensile steel sheets. To be more specific, when a steel sheet is hot-dip galvanized, its poor wettability causes the applied zinc not to adhere to some parts of the steel sheet, which are the so-called "bare spots", or an insufficient adhesion occurs in which the coating separates during press working. As a method for achieving high ductility and high tensile strength without increasing the Si content, there is a technique by which to positively increase the Al content in the steel to thereby decrease the Si content, the surface quality deterioration peculiar to the Si-added steel can be prevented and simultaneously the retained austenite can be made stable.

However, Al and Si being both readily oxidizable elements, an Al oxide film is also formed in addition to the Si oxide film during annealing, and therefore the problems of deterioration in hot-dip galvanizability and coating adhesion have not been solved.

According to a coated steel sheet and a method for manufacturing this steel sheet in the present invention, the diffusion of Al into the surface layer of the steel sheet is prevented, the amount of Al solid solution in the surface layer is decreased, and desired steel structure and mechanical properties can be secured. Moreover, the surface treatability, hot-dip galvanizability, post-painting corrosion resistance, and weldability can be improved. Furthermore, even if the steel sheet has a high Al content, a coating can be formed with excellent adhesion properties.

The invention claimed is:

1. A coated steel sheet having a coated layer on a surface of a steel sheet of a composition containing not less than 0.1 mass % and under 3 mass % of Al, wherein a following condition A or B is met:

A: An AlN precipitate layer exists on a matrix side near an interface between said steel sheet and said coated layer B: Oxide of Al exists in said matrix right under said surface of said steel sheet.

2. A coated steel sheet according to claim 1, wherein said coated layer is a hot-dip galvanized layer containing 0.1~1.0 mass % of Al.

3. A coated steel sheet according to claim 2, wherein said coated layer is a Zn—Fe galvanneal coating that further contains 7~15 mass % of Fe.

4. A coated steel sheet according to claim 2, wherein there is an AlN precipitate layer on the matrix side near an interface between said steel sheet and said coated layer and said AlN precipitate layer has a thickness of not less than 1 μm and not more than 100 μm.

5. A coated steel sheet according to claim 2, wherein said steel composition further contains one or two kinds selected from not less than 0.1 mass % of Si and not less than 0.5 mass % of Mn.

6. A coated steel sheet according to claim 2, wherein said steel composition further contains one or two kinds selected from not less than 0.01 mass % and not more than 1 mass % of Mo and not less than 0.005 mass % and not more than 0.2 mass % of Nb.

7. A coated steel sheet according to claim 2, wherein said steel composition further contains not less than 0.01 mass % and not more than 0.5 mass % of Cu, not less than 0.01 mass % and not more than 1 mass % of Ni, and not less than 0.01 mass % and not more than 1 mass % of Mo.

8. A coated steel sheet according to claim 2, wherein said steel composition further contains 0.03~0.25 mass % of C, 0.001~1.0 mass % of Si, 0.5~3.0 mass % of Mn, and 0.001~0.10 mass % of P.

9. A coated steel sheet according to claim 8, wherein in said steel matrix, there are one or more kinds selected from oxides of $SiO_2$, MnO, $FeSiO_3$, $Fe_2SiO_4$, $MnSiO_3$, $Mn_2SiO_4$, and $P_2O_5$.

10. A coated steel sheet according to claim 8, wherein the amount of oxides in total per one side surface is 0.01~1.0 g/m$^2$.

11. A coated steel sheet according claim 8, wherein the steel composition contains 0.01~1.0 mass % of Mo and 0.005~0.2 mass % of Nb.

12. A coated steel sheet according to claim 8, wherein the steel composition is 0.01~0.5 mass % of Cu, 0.01~1.0 mass % of Ni, and 0.01~1.0 mass % of Mo.

13. A coated steel sheet according to claim 8, wherein the coated layer is a hot-dip galvanized layer and is galvannealed.

14. A coated steel sheet according to claim 8, wherein the Fe content in the galvannealed coated layer is 7~15 mass %.

15. A method for manufacturing a coated steel sheet comprising the steps of heating and holding a steel slab and hot-rolling said slab, and hot-dip-galvanizing a steel sheet, wherein said slab contains not less than 0.1 mass % under 3 mass % of Al, and said holding is carried out in an atmosphere containing not less than 1 vol % and not more than 20 vol % of $O_2$ and not less than 70 vol % of $N_2$ under the conditions that meet an equation (1) shown below and said galvanizing is performed by using a galvanizing bath with an Al concentration in the bath is 0.14~0.24 mass % at a bath temperature of 440~500° C.

$$\{\text{Heating and holding temp.}(°C.)-(1050+25Al)\} \times \text{heating and holding time (min)} \geq 3000 \quad (1)$$

wherein Al denotes an Al content (mass %) in the steel.

16. A method for manufacturing a coated steel sheet according to claim 15, wherein said steel sheet is galvanized by using a galvanizing bath of Al concentration of 0.10~0.20 mass % in the bath at a bath temperature of 440~500° C. and the hot-dip-galvanized layer is further subjected to a galvannealing process at 460~550° C.

17. A method for manufacturing a coated steel sheet according to claim 15, wherein cold-rolling is carried out between the hot-rolling process and the hot-dip galvanizing process.

18. A method for manufacturing a coated steel sheet according to claim 15, wherein said steel slab further contains one or two kinds selected from not less than 0.1 mass % of Si and not less than 0.5 mass % of Mn.

19. A method for manufacturing a coated steel sheet according to claim 15, wherein said slab further contains one or two kinds selected from not less than 0.01 mass % and not more than 1 mass % of Mo and not less than 0.005 mass % and not more than 0.2 mass % of Nb.

20. A method for manufacturing a coated steel sheet according to claim 15, wherein said slab further contains not less than 0.01 mass % and not more than 0.5 mass % of Cu and not less than 0.01 mass % and not more than 1 mass % of Ni, and not less than 0.01 mass % and not more than 1 mass % of Mo.

\* \* \* \* \*